(12) United States Patent
Price et al.

(10) Patent No.: US 10,001,622 B2
(45) Date of Patent: Jun. 19, 2018

(54) MULTIFUNCTION AUTOFOCUS SYSTEM AND METHOD FOR AUTOMATED MICROSCOPY

(75) Inventors: Jeffrey H. Price, San Diego, CA (US); Derek N. Fuller, San Diego, CA (US); Albert L. Kellner, San Diego, CA (US); Behrad Azimi, La Jolla, CA (US)

(73) Assignees: Sanford Burnham Medical Research Institute, La Jolla, CA (US); Vala Sciences, Inc., San Diego, CA (US)

( * ) Notice: Subject to any disclaimer, the term of this patent is extended or adjusted under 35 U.S.C. 154(b) by 737 days.

(21) Appl. No.: 13/317,727

(22) Filed: Oct. 25, 2011

(65) Prior Publication Data

US 2013/0100272 A1 Apr. 25, 2013

(51) Int. Cl.
*G02B 7/38* (2006.01)
*G02B 21/36* (2006.01)
*H04N 5/225* (2006.01)
*H04N 5/232* (2006.01)
*H04N 9/09* (2006.01)
*G02B 21/24* (2006.01)
*G02B 13/08* (2006.01)

(52) U.S. Cl.
CPC ............. *G02B 7/38* (2013.01); *G02B 21/365* (2013.01); *H04N 5/2258* (2013.01); *H04N 5/23212* (2013.01); *H04N 9/09* (2013.01); *G02B 13/08* (2013.01); *G02B 21/242* (2013.01)

(58) Field of Classification Search
CPC ............. H04N 7/18; H04N 5/232; G02B 7/38
USPC ............................................ 348/79
See application file for complete search history.

(56) References Cited

U.S. PATENT DOCUMENTS 4,025,949 A * 5/1977 Whitman ............. G11B 7/0909
250/201.5
4,392,054 A * 7/1983 Sato ...................... H01J 37/153
250/307

(Continued)

FOREIGN PATENT DOCUMENTS

JP H07-177527 7/1995 ............... H04N 9/09
JP H08-289191 11/1996 ............... H04N 5/232

(Continued)

OTHER PUBLICATIONS

International Search Report and Written Opinion, dated Jan. 29, 2010 in PCT/US09/05633, filed Oct. 14, 2009.

(Continued)

*Primary Examiner* — Jay Patel
*Assistant Examiner* — Irfan Habib
(74) *Attorney, Agent, or Firm* — Terrance A. Meador

(57) ABSTRACT

Multifunction autofocus for automated microscopy includes automatic coarse focusing of an automated microscope by reflective positioning, followed by automatic image-based autofocusing of the automated microscope performed in reference to a coarse focus position. In some aspects, the image-based autofocusing utilizes astigmatism in microscope optics for multi-planar image acquisition along a Z axis direction of a microscope. In some other aspects, the image-based autofocusing utilizes astigmatism in microscope optics in combination with chromatic aberration for multi-planar image acquisition along the Z axis direction.

5 Claims, 26 Drawing Sheets

(56) References Cited

U.S. PATENT DOCUMENTS

| | | | | |
|---|---|---|---|---|
| 4,540,881 | A * | 9/1985 | Hayashi | G02B 7/38 250/201.7 |
| 4,952,787 | A * | 8/1990 | Nakamura | G11B 7/0908 250/201.5 |
| 5,161,052 | A | 11/1992 | Hill | 359/377 |
| 5,548,661 | A | 8/1996 | Price et al. | 382/133 |
| 5,675,140 | A * | 10/1997 | Kim | C04B 41/52 250/201.2 |
| 5,790,692 | A | 8/1998 | Price et al. | 382/133 |
| 5,790,710 | A | 8/1998 | Price et al. | 382/255 |
| 5,856,665 | A | 1/1999 | Price et al. | 250/205 |
| 5,995,143 | A | 11/1999 | Price et al. | 348/345 |
| 6,038,066 | A | 3/2000 | Baumann | 359/368 |
| 6,188,514 | B1 | 2/2001 | Saito et al. | 359/381 |
| 6,547,397 | B1 * | 4/2003 | Kaufman | G01B 11/002 353/122 |
| 6,640,014 | B1 | 10/2003 | Price et al. | 382/255 |
| 6,760,154 | B1 | 7/2004 | Focht | 359/383 |
| 6,839,469 | B2 | 1/2005 | Nguyen et al. | 382/255 |
| 7,071,451 | B2 | 7/2006 | Ishikawa et al. | 250/201.4 |
| 7,262,419 | B2 | 8/2007 | Richardson | 250/458.1 |
| 7,428,324 | B2 * | 9/2008 | Crandall | G02B 21/002 382/128 |
| 7,831,138 | B2 * | 11/2010 | Nakahara | G03B 13/36 348/349 |
| 7,929,044 | B2 * | 4/2011 | Chen | H04N 5/23212 348/345 |
| 8,174,686 | B2 * | 5/2012 | Namba | G01N 21/6458 250/201.2 |
| 8,264,593 | B2 * | 9/2012 | Mori | G02B 7/36 348/345 |
| 8,531,581 | B2 * | 9/2013 | Shroff | H04N 5/23212 348/335 |
| 9,213,177 | B2 * | 12/2015 | Olson | G02B 21/002 |
| 2001/0026400 | A1 | 10/2001 | Yoshikawa | 359/676 |
| 2002/0113210 | A1 | 8/2002 | Treado et al. | 250/331 |
| 2003/0085334 | A1 | 8/2003 | Reznichenko | 250/201.5 |
| 2003/0184730 | A1 | 10/2003 | Price et al. | 356/39 |
| 2003/0201393 | A1 * | 10/2003 | Tsuneta | H01J 37/26 250/311 |
| 2004/0159773 | A1 | 8/2004 | Fein et al. | 250/208.1 |
| 2005/0036122 | A1 * | 2/2005 | Nomura | G03F 7/706 355/53 |
| 2005/0127271 | A1 * | 6/2005 | Ortyn | G01N 15/1459 250/201.4 |
| 2006/0227413 | A1 * | 10/2006 | Gilbert | G02B 21/0016 359/368 |
| 2006/0244907 | A1 | 11/2006 | Simmons | 351/162 |
| 2007/0002434 | A1 * | 1/2007 | Juskaitis | G02B 3/0081 359/368 |
| 2007/0139541 | A1 * | 6/2007 | Fein | G01N 21/6458 348/294 |
| 2007/0206843 | A1 * | 9/2007 | Douglass | G01N 15/1475 382/128 |
| 2009/0060303 | A1 * | 3/2009 | Douglass | G01N 1/312 382/128 |
| 2009/0195688 | A1 * | 8/2009 | Henderson | G02B 21/002 348/345 |
| 2010/0085576 | A1 * | 4/2010 | Norton | G01N 21/956 356/521 |
| 2010/0172020 | A1 * | 7/2010 | Price | G02B 21/0016 359/381 |

FOREIGN PATENT DOCUMENTS

| | | | |
|---|---|---|---|
| JP | 10-221607 | 8/1998 | G02B 21/00 |
| JP | H10-31161 | 10/1998 | G02B 21/02 |
| JP | 11-052255 | 2/1999 | G02B 21/36 |
| JP | 2000-009591 | 1/2000 | G01M 11/00 |
| JP | 2000-512401 | 9/2000 | G02B 21/00 |
| JP | 2005-202092 | 7/2005 | G02B 7/28 |
| JP | 2006-003543 | 1/2006 | G02B 21/26 |
| JP | 2007-047228 | 2/2007 | G02B 21/02 |
| JP | 2008-116900 | 5/2008 | G02B 21/06 |
| JP | 2009-525495 | 7/2009 | G02B 21/00 |
| WO | 2009/055429 A1 | 4/2009 | G02B 21/00 |
| WO | 2013/063096 A1 | 1/2013 | G11B 11/00 |

OTHER PUBLICATIONS

Extended European Search Report, dated May 24, 2013 in EP 09820901.8.

Office Action for JP 2011-531034, dated Dec. 13, 2013, with translation.

International Search Report and Written Opinion, dated Feb. 28, 2013 in PCT/US2012/061667, filed Oct. 24, 2012.

* cited by examiner

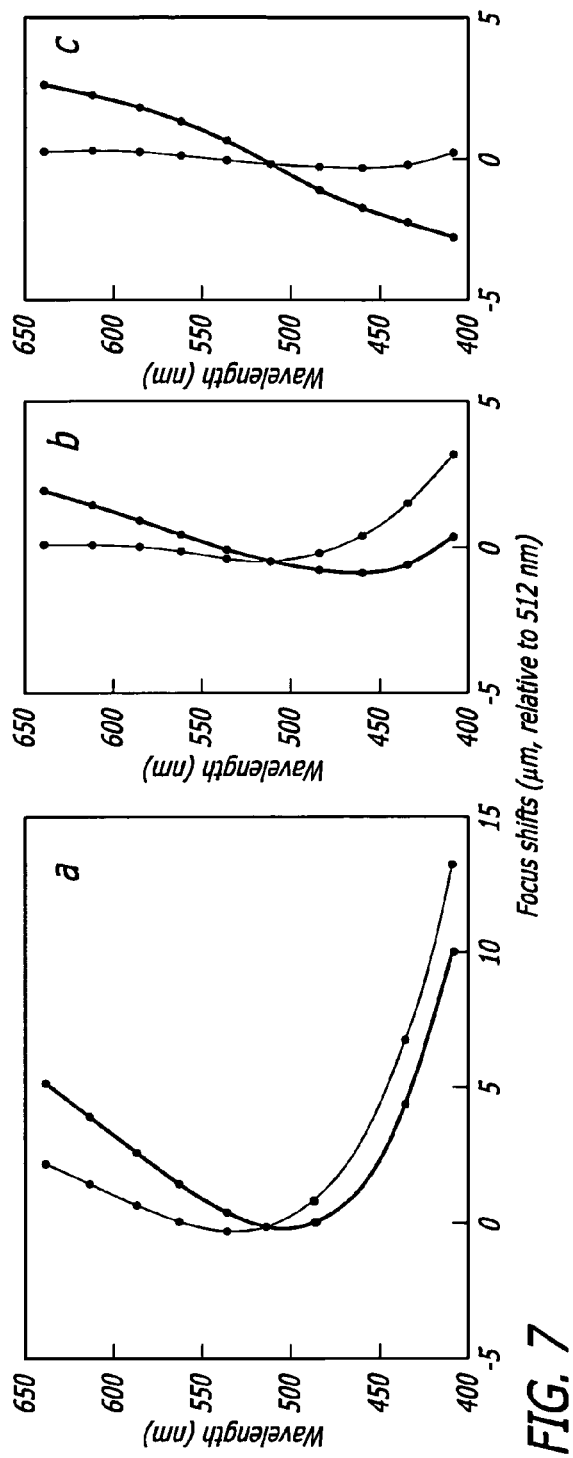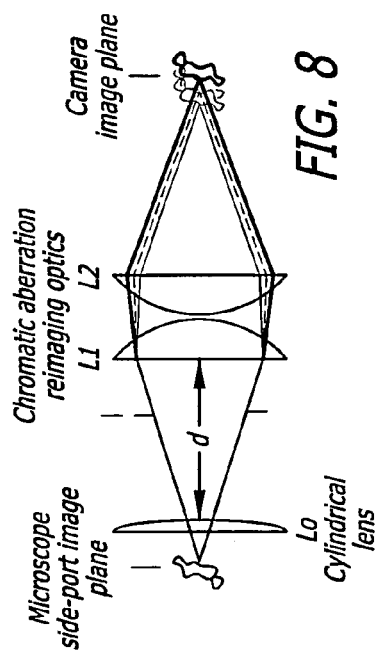
FIG. 7
FIG. 8

*Five Channel Color Prism*

1. AAF Module (shown)
2. Slides: Bright field (transmission) white/color strobe light module (not shown)
3. Plates:Oblique (reflection dark field) illumination module (not shown)
4. AAF Software Source Code Module

MULTIFUNCTION AUTOFOCUS SYSTEM AND METHOD FOR AUTOMATED MICROSCOPY

STATEMENT OF GOVERNMENT INTEREST

The invention or inventions described herein were made in part with United States government support under NIBIB Grant 5 R01 EB006200, NHGRI Grant 5 U54 HG003916, and NHGRI Grant HG005033-CDP3, all awarded by the National Institutes of Health. The United States government has certain rights in this invention.

RELATED APPLICATIONS

This application contains subject matter related to the subject matter of U.S. patent application Ser. No. 12/587,923, filed Oct. 14, 2009.

BACKGROUND

The field includes automated microscopy. More particularly, the field includes automatically focusing a microscope using a reflection from a reference surface positioned with respect to an objective of the microscope and information acquired from magnified images obtained by the microscope. In particular, the field includes a multifunction autofocus mechanism for automated microscopy that combines reflective positioning with use of the image characteristics obtained from a sequence of focal planes.

Automated microscopy refers to a microscope system including a microscope equipped with one or more motor-actuated components and a programmable control mechanization that governs the functions of the system and operates one or more motor-actuators to set and/or change operational conditions of the microscope. Such conditions include, for example, focus, illumination, and specimen position. The microscope includes an objective and a stage. In particular, but without limitation, the control mechanization operates to automatically focus the microscope and to scan a specimen via the microscope by generating control signals that cause relative movement between the objective and the stage. In some aspects, the stage is motorized and the control mechanization, using autofocus and positioning algorithms, processes images to generate control signals operative to cause the motorized stage to be moved and/or positioned in three dimensions with reference to the objective. See, for example, http://www.microscopvu.com/articles/livecellimaging/automaticmicroscope.html.

Image-based autofocus of a microscope uses a value obtained by transformation of a magnified image to indicate a degree of focus or sharpness. For example, but without limitation, presume an automated microscope stage supports a sample plate with one or more samples on a surface thereof. (The term "sample plate" is used herein to denote a microscope component such as a microscope slide, a multiwall plate, a microtiter plate, or equivalent). The stage is operated to place the sample plate at an X-Y location where the stage is moved vertically through a succession of vertical (Z) positions. At a first Z position, a magnified image is obtained from the sample, and the magnified image is transformed to obtain a first value of an image characteristic such as focus. A second value is obtained by the same transformation of another magnified image obtained at a second Z position. More values are obtained at additional vertical positions. The values are compared and an automated stage controller is operated to move the stage to a vertical position where the values indicate the best degree of focus is obtained. In automated scanning microscopy, best focus is maintained in this manner as the sample plate is scanned by systematically moving the stage in an X-Y scan pattern. See, for example, U.S. Pat. Nos. 5,548,661; 5,790,710; 5,790,710; 5,995,143; 6,640,014; and 6,839,469. Other mechanisms can be utilized to change focus to different focal planes of a specimen, including movement of the objective relative to the stage. If a camera is used for image acquisition, the camera can be moved relative to the objective, and/or optical elements between the camera and objective can be moved.

Reflective positioning autofocus does not use a magnified image obtained from a sample to determine best focus; rather, it uses a light signal that is generated by the microscope's optical system, projected through the objective toward the sample plate, and reflected off of a surface of the sample plate, back through the objective. A desired focus location for the sample is obtained by a value entered by a user that vertically offsets the focal plane from the Z position where the reflected light signal is in focus. See, for example, U.S. Pat. No. 7,071,451; see also the Nikon® perfect focus system description at http://www.microscopvu.com/tutorials/flash/focusdrift/perfectfocus/index.html.

Automated digital imaging with a high resolution microscope requires autofocus that performs with submicron accuracy and precision. Both image-based autofocus and reflective positioning exhibit shortcomings that compromise performance in virtually all modes of high resolution whole-slide and whole-microtiter plate automated imaging. Image-based autofocus does find a best focus location in a three-dimensional specimen, but it is slow. Image-based autofocus finds the best focus as indicated, for example, by a best resolution of the sample itself; but it can be fooled by empty fields of view and artifacts (e.g., clumps of cells or debris). It has been found that the speed of image-based autofocus can be increased by taking advantage of chromatic aberrations to increase the number of planes per image at which sharpness/resolution measurements are made simultaneously, thereby also reducing the complexity of the multi-planar imaging optics. See, in this regard, US 2010/0172020, published Jul. 8, 2010, for "Automated Scanning Cytometry using Chromatic Aberration for Multiplanar Image Acquisition". Reflective positioning is designed to speed up total internal reflective (TIRF) microscopy where the goal is to find a single image plane—the surface at which the image is created. However, it cannot find the best focal planes of cells and tissue sections that inevitably reside at different distances from the reflective surface. Thus, although reflective positioning is fast, it requires an estimate of the axial offset from the reflecting surface that can exhibit substantial variability during a scan, thereby often deviating from best focus.

The combination of automated microscopy with image cytometry has become an essential biological research tool that is incorporated into a wide variety of applications. Such applications include: high content screening (HCS) instruments use in compound (drug discovery and toxicity) and genomic (RNAi and cDNA) automated screening, where libraries of hundreds to tens of thousands can be screened by individual investigators and whole genomes and compound libraries of hundreds of thousands can be screened by large laboratories; high throughput microscopy (HTM) where screening per se is not necessarily the experimental goal; and image (or scanning) cytometers where the emphasis is on automated spatially dependent measurements of large numbers of cells as a superset of the measurements acquired by flow cytometry instruments. The latter application tends to be used more in analysis of tissue sections and the former more often for cell monolayers, but the principles are analogous. In the last decade, HCS/automated image cytometry has grown rapidly not only for large screening efforts but also for routine use in individual labs enabling automated parallel analysis of from one to a few 96-, 384-well microtiter plates where months or years of experiments can be distilled into a few weeks (aka, HC analysis or HCA). Advances in automatic acquisition, measurement, comparison and pattern classification tools for cellular images continue to add sophisticated new automation for mining statistically relevant quantitative data from the inherently heterogeneous cell populations.

Obtaining a sharply focused image automatically is a key requirement for automated microscopy. It is therefore desirable to provide autofocus systems and methods that improve the speed and image sharpness of an automated microscopy system while still providing a best focus for each magnified image acquired.

Measurement of Image-Based Autofocus Accuracy

Best focus of a microscope is the Z (axial) position with the best resolution of an image. Autofocus error is, in turn, defined by an axial distance from best focus and a degree of defocus is reported as a percent loss in resolution.

To find best focus as a standard against which to compare autofocus methods, measurements of the slope of the change in brightness of the images of a "knife edge" were made on through-focus stacks of reflection images centered on the sharp edge between 100% transmitting and 100% reflective regions on a microscope resolution target. The derivatives of 35 lines perpendicular to the knife edge and near the center of the through-focus stacks of the knife edge were fit with Gaussians. The resolution was computed as 2.77*(mean of standard deviations ("SDs") of the 35 Gaussian fits of each optical section), which, in some respects, corresponds to translating this experimental knife-edge resolution measurement to the theoretical Rayleigh resolution criterion. The results for two different 20× objectives (0.75 NA 20× Nikon® Plan Apo VC and Nikon® 0.5 NA 20× Plan Fluor) are plotted in FIG. 1.

In FIG. 1, the left-hand graph shows resolution in μm as a function of defocus distance in micrometers (μm) with diamonds marking the best focus positions via an image-based autofocus system and method to be described. The right-hand graph shows the same data as a percent change in resolution (100*(Resolution—Best Resolution)/(Best Resolution)) plotted as a function of defocus distance. The knife edge measurements and the autofocus measurement were performed on the same stack of images. Table 1 summarizes best resolutions, autofocus errors, and corresponding resolution losses per FIG. 1.

TABLE 1

Knife-Edge Best Resolutions and Autofocus Errors

| | | Resolution (μm) | Autofocus Error | Autofocus Loss of Resolution |
|---|---|---|---|---|
| 0.75 NA 20X: | 1.0X Relay Lens | 0.71 μm | 0.250 μm | 0.020 μm (2.8%) |
| | 1.5X Relay Lens | 0.51 μm | 0.100 μm | 0.001 μm (0.2%) |
| 0.50 NA 20X: | 1.0X Relay Lens | 0.78 μm | 0.050 μm | 0.030 μm (3.8%) |
| | 1.5X Relay Lens | 0.69 μm | 0.650 μm | 0.040 μm (5.8%) |

FIG. 1 and Table 1 show that:
1. Through-focus resolution measurements can objectively identify best focus,
2. Image-based autofocus is accurate (resolution losses of 0.2-6% are likely within resolution measurement noise—see also Table 2); it is a resolution measure that is designed to be insensitive to contrast reversals (See Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007)),
3. Decreased sampling (1.0× instead of 1.5× tube lens) resulted in decreased peak resolution without always decreasing the sensitivity of resolution to defocus far from focus,
4. Lower NA objectives have both lower maximum resolution and greater depth of field than objectives with higher NA.

This approach provides a way to grade the severity of reflective positioning and autofocus errors. A standard criterion to define "out of focus" for an image detector is the depth of field obtained per Equation (1):

$$d_{tot} = \frac{\lambda_0 n}{NA^2} + \frac{n}{MNA}e \qquad (1)$$

where $\lambda_0$ is the wavelength of light, n is the index of refraction of the immersion medium, NA is the numerical aperture, M is the magnification, and e is smallest distance that can be resolved by the detector (From Inoue, S. & Spring K. R., *Video Microscopy, The Fundamentals*, (Plenum, N.Y., 1997). The depth of field and corresponding focus error data are summarized in Table 2.

TABLE 2

Depth of Field Out of Focus Distances

| | 20X 0.75 NA Objective | | 20X 0.5 NA Objective | |
|---|---|---|---|---|
| | 1.0X Tube Lens | 1.5X Tube Lens | 1.0X Tube Lens | 1.5X Tube Lens |
| Depth of Field (μm)[a] | 1.23 μm | 1.04 μm | 2.66 μm | 2.43 μm |
| Resolution Loss (%)[b] | 21% | 23% | 29% | 34% |
| Distances from Focus | −0.6, 0.63 μm | −0.44, 0.6 μm | −1.38, 1.28 μm | −1.4, 1.03 μm |

[a]See Eq. (1).
[b]Determined from FIG. 1 data.

For comparison with detection of defocus by eye, see the enlarged through-focus sequences of DAPI-labeled NIH-3T3 cells in FIG. 2. The sequences were obtained using a Nikon® Ti-E microscope with a Nikon® 0.75 NA 20× Plan Apo VC objective and 1.0× and 1.5× tube lenses. The images were captured on a Hamamatsu® ORCA ER CCD (6.45×6.45 μm² pixels) sampled at 0.323×0.323 μm²/pixel and 0.215×0.215 μm²/pixel, respectively. Defocus of +1.0 μm appears less blurry than −1.0 μm (compare with nuclear edges at 0.0-μm defocus); defocus is asymmetric about best focus consistent with optical theory. Note that in both sequences blur is visible 1.0 μm from best focus, which corresponds to about a 50% loss in resolution.

Both image-based autofocus and reflective positioning exhibit limitations that compromise performance for some fields of view encountered in both whole-slide and whole-microtiter plate scanning. One solution, as in the PerkinElmer Opera® imaging reader, is to remove some of the out-of-focus information with confocal optics; but this is an expensive approach that may also be less optimal than imaging at best focus. Reflective positioning can take <0.1 s and autofocus can take as long as 1-2 s using previous technology. Reflective positioning locates a surface and collects the image at a preset user-defined offset from the surface.

Autofocus is an important component of microscope automation: if autofocus is poor, the primary output—the image, as well as the data derived from it—are compromised. As opposed to macroscopic digital imaging (photography), where depths of field even with close-up low F/# lenses are measured in millimeters, the microscopic depth of field with a 20× 0.75 NA objective and 0.52 NA condenser is 1.23 µm with a 1.0× tube lens (see Table 2). This makes microscopy autofocus substantially more challenging than autofocus in macroscopic photography. At about NA 0.5 and higher, depths of field are often comparable to the thicknesses of commonly cultured, tightly adherent cells (rounded, less adherent cells, such as T-lymphocyte cell lines, exceed the depth of field at even lower NAs). Many reflective systems sense only the first surface, and most specimen holders (coverslips, slides, and membrane-, glass-, and plastic-bottom microtiter plates) vary in thickness. Reflective system characteristics include: absolute (open loop) displacement sensors, error-minimizing (closed loop) positioning, and through the lens (TTL) and non-TTL (or beside the lens, BTL) configurations. By observing the digital images produced by reflective positioning HCS instruments as they scan, out-of-focus images are visible to the eye. Image-based autofocus optimizes the quality, sharpness, and or resolution of the image itself depending on the algorithm. But autofocus can also be compromised by a poor specimen (e.g., thick piles of dead cells or debris and lint or fibers occupying large axial ranges), out-of-focus contrast-generating artifacts (e.g., cells, debris, scratches, condensation, dried water droplets and lint on the other surfaces of the specimen holder—coverglass, slide or plate bottom), and by mismatches in image sampling that alter the system modulation transfer function and violate the assumptions about the native resolution of the image upon which the sharpness measurements rely. There are many other things that can compromise image quality, including not properly aligning the condenser and lamp. Relative merits of the two approaches are summarized in Table 3.

TABLE 3

Summary of Autofocus vs. Reflective Positioning Tradeoffs

| Autofocus - Focuses on Image | Reflective Positioning to a Surface |
| --- | --- |
| Directly optimizes image quality | "Guesses" specimen location based on user-defined offset from a specimen holder surface |
| Advantages include: | Advantages include: |
| Focuses properly even if the absolute specimen position changes | Requires less calibration |
| Finds best "average" focus position in thicker samples | Likely to work even if microscope not aligned |
| Discerns focus with better precision than by eye | Always positions in the same location, even if the sample very thick or if there is debris |
|  | Best for total internal reflection microscopy (TIRF) |
| Poor focus possible with: | Poor focus possible with: |
| Thick debris | NA ≥0.5 where depths of field approach specimen thicknesses |
| Out-of-focus artifacts on other surfaces including dirty optics | Substrates with varying thickness where the first surface is sensed and the specimen is on the second surface |
| Poorly aligned microscope components | |
| Mismatches in optical sampling (camera resolution vs. optical magnification, NA, zoom, etc.) | Coatings on plates, slides and coverslips - e.g., Matrigel for primary cells - that vary in thickness |
| Dim illumination, or too bright illumination (above camera saturation) | Offset not recalibrated for changes in preparation - e.g., altering adherence of cells with coatings |
| Other factors: | Other factors: |
| Slow: ~0.25 s (IC 100, adjacent images) | Fast (10 s of ms) |
| Slower when next field is far out of focus (e.g., from well to well in irregular microtiter plates) | Speed minimally dependent on re-focus distance (e.g., with piezo focus, add ~10 ms/50 µm) |

We observed that with cell monolayers cultured on a coverslip, reflective positioning can provide reasonably focused images, whereas with cells cultured on the slide or tissue sections mounted on the slide, the degree of defocus appeared greater.

Image-based autofocus, on the other hand, finds the sharpest image directly from a stack of images. For example, autofocus functions based on image resolution find the axial position where the most cells are in focus if the tissue is thicker than the depth of field. (Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007)) However, if the field is blank or if there is debris out of the normal plane of focus, autofocus can lose track of focus.

To understand these errors systematically, we used both image-based autofocus and reflective positioning to scan three specimens:

1) NIH 3T3 cells cultured on a coverslip,
2) A histological section of human prostate cancer, and
3) Adipocytes differentiated from 3T3-L1 cells cultured in a 96-well microtiter plate FIG. 3 illustrates differences between image-based autofocus and a commercially-available reflective positioning system (a Nikon® Perfect Focus System) on DAPI labeled NIH 3T3 cells cultured on a coverslip using a Ti-E with image-based autofocus added. A 4×1 cm² area comprising 157×67=10,519 fields (images) was scanned with reflective positioning and image-based autofocus also calculated by sampling 20 focal planes in a range of 10 μm centered at the reflective positioning offset (20× 0.75 NA VC). The histogram in FIG. 3 shows that for NIH 3T3 cells grown on a coverslip, the range of reflective positioning errors relative to image-based autofocus is about ±4 μm with most errors <±2 μm. The two example fields exhibiting reflective positioning focus error in FIG. 3 also show how image-based autofocus succeeds in focusing on most of the nuclei even where cells are distributed axially beyond the depth of field (1.23 μm for the 20× 0.75 NA objective used for FIG. 1, as shown in Table 2).

A test of the differences between image-based autofocus and reflective positioning on a prostate cancer tissue section using the same experimental setup are shown in FIG. 4. This figure shows differences between image-based autofocus and reflective positioning (using a Nikon® microscope equipped with the Perfect Focus System that performs reflective positioning) on a 5-μm thick section cut from formalin-fixed paraffin-embedded (FFPE) prostate cancer tissue and labeled with DAPI (blue) and for AMACR (green) and ACTA2 (red). A 2.2×1.0 cm² area comprising 94×64=6,016 fields was scanned with reflective positioning and image-based autofocus calculated by sampling 20 focal planes in a range of 10 μm centered at the reflective positioning offset (using the 20× 0.75 NA VC objective). The error range shown in the histogram in FIG. 4 is larger at about ±7.5 μm than for cells cultured on the coverslip (FIG. 3). The 3D plot of focus errors exhibits tilt likely because the coverslip is not parallel to the slide, which contributes to the larger range of errors. Conversely, focus tracking with image-based autofocus is compromised at the left and right corners of the scan region in the 3D plot of focus differences because those areas of the slide contained no tissue. Out of focus empty fields aren't relevant, but focus tracking at the next field of view containing tissue can be compromised if the system wanders too far from best focus. The present disclosure provides a way to correct for this by using reflective positioning in conjunction with image-based autofocus.

FIG. 5 shows reflective positioning focus errors on a Nikon® perfect focus system with a Nikon® 0.75 NA 20× Plan Apo VC plotted (left) for a 96-well microtiter positive control plate for a lipid-reducing assay (for screening for compounds that inhibit lipid formation as might be utilized to screen to discover new weight loss drugs) in adipocytes differentiated from 3T3-L1 cells (top). Image-based autofocus was performed on the DAPI channel in a search range of 10 μm in 0.5 μm steps and 16 fields/well were scanned. The reflective positioning error envelope in the histogram in FIG. 5 is about −3 to +5 μm (see the histogram, FIG. 5, middle-right). The middle-left color temperature plot best demonstrates the unexpected trend of changing reflective positioning errors across the plate (likely due to changing bottom thickness). This trend is seen as a tilt in the error from row 1 to row 8 (see the heat map and 3D plot in FIG. 5, bottom), consistent with a change in thickness of ~2 μm across the coverglass bottom of the plate. The middle-right histogram of the error distribution shows that a substantial number of the images are >1.0 μm, or more, out of focus, i.e., visibly blurred. The lower 3D surface plot best demonstrates the local variations in reflective positioning errors. The positive control plate for inhibition of lipid formation is created by beta-adrenergic stimulation of the cells with isoproterenol, which results in hormone sensitive lipase (HSL) activation (quantified via increased brightness of anti-HSL fluorescent-labeled antibody, (anti-HSL) in rings around the lipid droplets) followed by a reduction of lipid (quantified by cellular brightness of a fluorescent lipid label). The image colors are blue (DAPI/Nuclei), green (lipid droplets), and red (anti-HSL). The HSL rings around the lipid droplets exhibit the kind of fine detail (rings are especially visible in the anti-HSL image) expected to be most sensitive to blurring caused by focus errors.

For all three specimens (FIGS. 3-5)—cells cultured on a coverslip, a tissue section on a slide and cells cultured on a coverslip-bottom microtiter plate—the error distributions indicate that many images were out of focus using reflective positioning with an offset. In Table 4, the percentages of images out of focus are collated using both the depth of field criterion and an arbitrary loss in resolution of 50% (compare FIGS. 1 and 2).

TABLE 4

Percentages of Images Out of Focus

|  | >Depth of Field (21% Resolution Loss) | >50% Resolution Loss |
|---|---|---|
| NIH-3T3 Cells on Coverslip | 40% | 21% |
| Prostate Cancer Tissue Section | 80% | 71% |
| Adipocytes on Coverslip-Bottom 96-well Plate | 68% | 55% |

NIH-3T3 cells are adherent and flat, and are thus expected to provide a straightforward test for reflective positioning with an offset. Nevertheless, over 20% of the images are out of focus as judged by a 50% loss in resolution and 40% are out of focus as judged by the depth of field criterion.

In the examples of FIGS. 3-5, image-based autofocus reliably delivered the best focused images in "normal" fields of view when a difference could be discerned by eye. "Normal" fields of view are those with tissue that have no out-of-focus debris. We made three observations based on these experiments (FIGS. 3-5). First, image-based autofocus delivers better-focused images than reflective positioning on "normal" fields of view that have tissue present and are not compromised by debris out of the focal plane of the target tissue. Second, with reflective positioning (+ offset), 21-80% of the images were out of focus. Finally, reflective positioning kept track of the focal plane, even without any tissue present, keeping the cells within the 10-μm search range of image-based autofocus for a large proportion of the thousands of fields of view.

SUMMARY

These problems are solved by an auto-focusing sequence in which a reflective positioning procedure is performed to obtain an initial "focus guess" (or coarse focus), followed by an image-based autofocus procedure that obtains a fine focus with reference to the initial focus. Desirably, this sequence increases image quality and the robustness of autofocus. Because it integrates multiple focus functions, such a sequence is referred to as a "multifunction autofocus sequence". An autofocus method including a multifunction autofocus sequence is a multifunction autofocus method, and a mechanism that enables an automated microscopy system to perform such a sequence is referred to as a "multifunction autofocus mechanism." An automated microscopy system equipped with a multifunction autofocus mechanism has a multifunction autofocus construction and performs a multifunction autofocus method.

In an objective, the depth of field decreases inversely proportional to $NA^2$ (Eq. 1) and fluorescence brightness increases proportional to $NA^4$ and inversely proportional to magnification[2]. (Inoue, S. & Spring, K. R. *Video Microscopy, The Fundamentals*, (Plenum, N.Y., 1997). In high content assays and screens (HCA/S), high resolution is not always required. But large scale primary HCS motivates scanning as fast as images of sufficient quality can be collected. So the ability to use the highest NA objective at a given magnification is important. Instruments that cannot reliably provide in-focus images, however, motivate use of low NA objectives with greater depth of field to obtain consistent measurements, which collect less light, thereby requiring longer camera integration times and slowing screening. By providing accurate autofocus on every field, the multifunction autofocus sequence enables use of the best possible set of optics for each imaging application.

In some aspects it is desirable to exploit chromatic aberration in microscope optics wherein light of different colors is focused to different points along the Z axis due to the wavelength-dependence of the refractive indices of lenses. The dispersion of the focal planes for the different colors enables multi-planar image acquisition along the Z axis. In some other aspects, the number of color-dependent focal planes is increased by introduction of astigmatism into the microscope optics to create at least two different focal planes for each color.

Preferably, a multifunction autofocus system for automated microscopy includes a coarse focusing mechanism equipped with a reflective positioning system, in combination with a fine focusing mechanism equipped with an image-based autofocus system. In some aspects, the image-based autofocus system is equipped with a chromatic aberration optical mechanism in combination with an astigmatic optical mechanism for multi-planar image acquisition along the Z axis.

Preferably, a multifunction autofocus method for automated microscopy includes a coarse focusing procedure employing reflective positioning step, in combination with a fine focusing procedure employing image-based autofocus. In some aspects, an image-based autofocus procedure uses a plurality of images along the Z axis that have been generated by chromatic aberration in combination with astigmatism.

BRIEF DESCRIPTION OF THE DRAWINGS

FIG. 7 is a set of plots of chromatic aberration focal shifts for three objectives.

FIG. 8 is schematic illustration of a relay lens used to control chromatic aberration, with an optical element added to induce astigmatism.

SPECIFICATION

Figure 1:
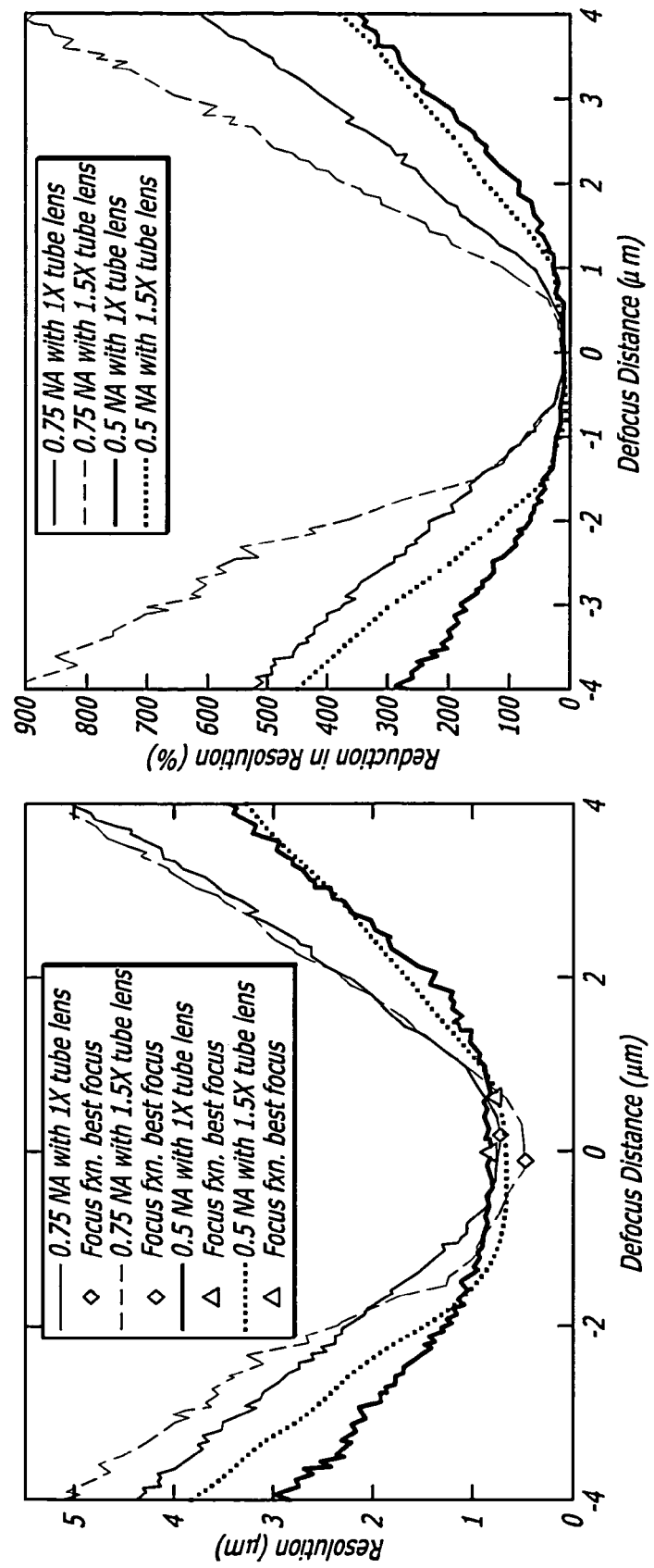
FIG. 1 includes two graphs showing defocus distance for two microscope objectives, in which the left-hand graph shows defocus distance as a function of resolution, and the right-hand graph shows defocus distance as a function of percentage reduction in resolution.
Figure 2:
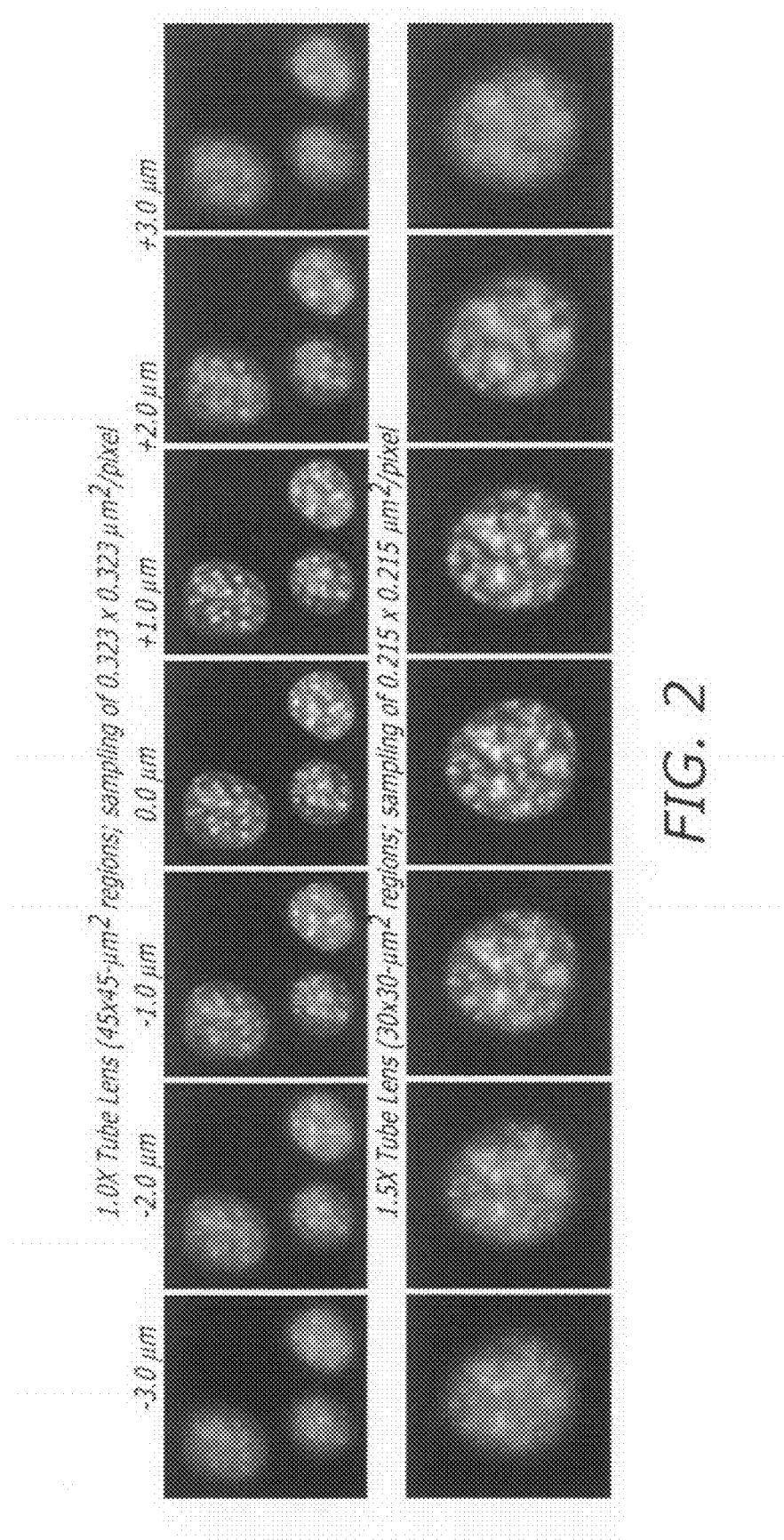
FIG. 2 shows through-focus sequences of images of magnified cell nuclei obtained through a commercial microscope.
Figure 3:
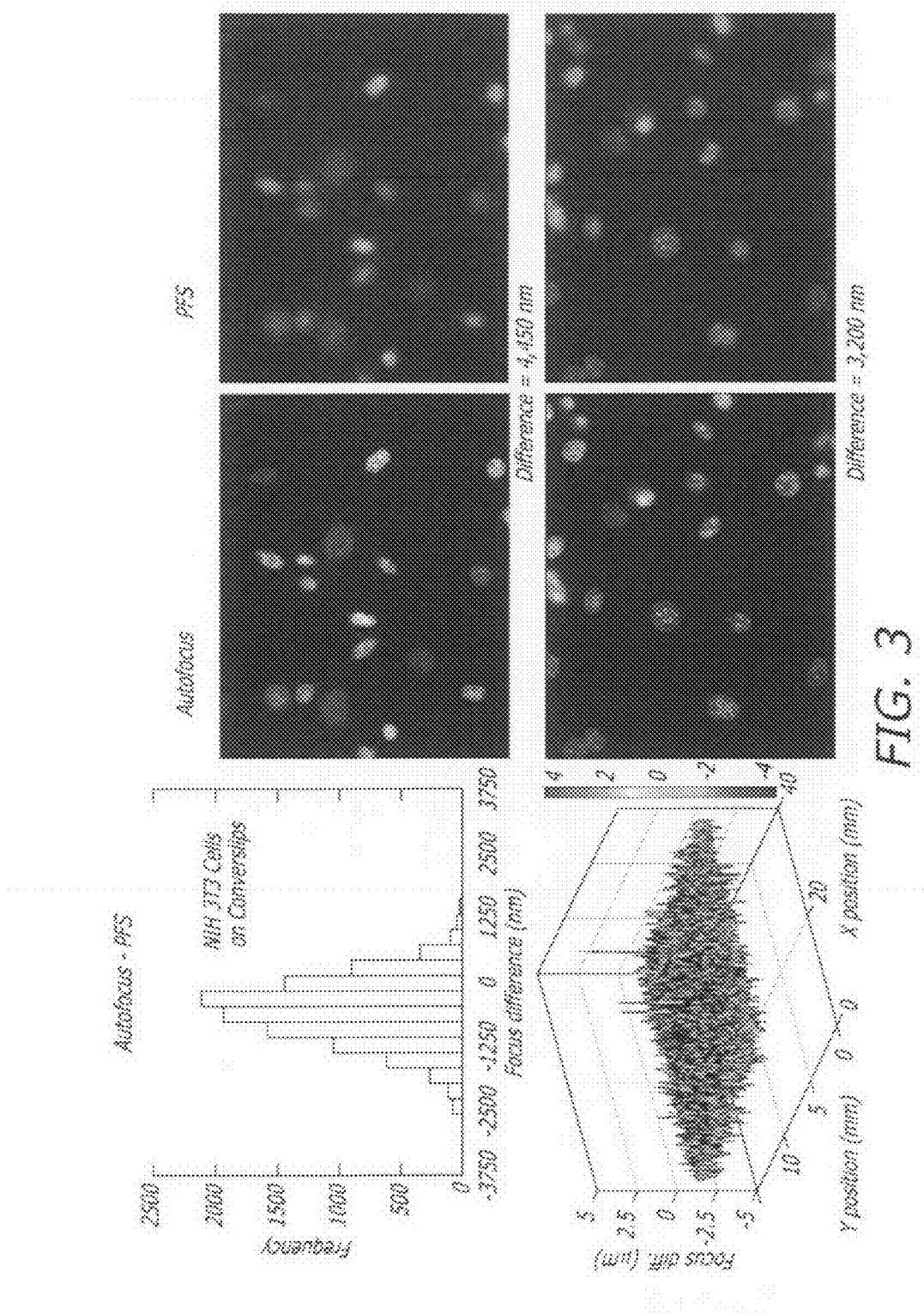
FIG. 3 is a set of representational illustrations showing differences in focus results between an image-based autofocus procedure and a reflective positioning procedure with respect to magnified images of DAPI labeled NIH 3T3 cells.
Figure 4:
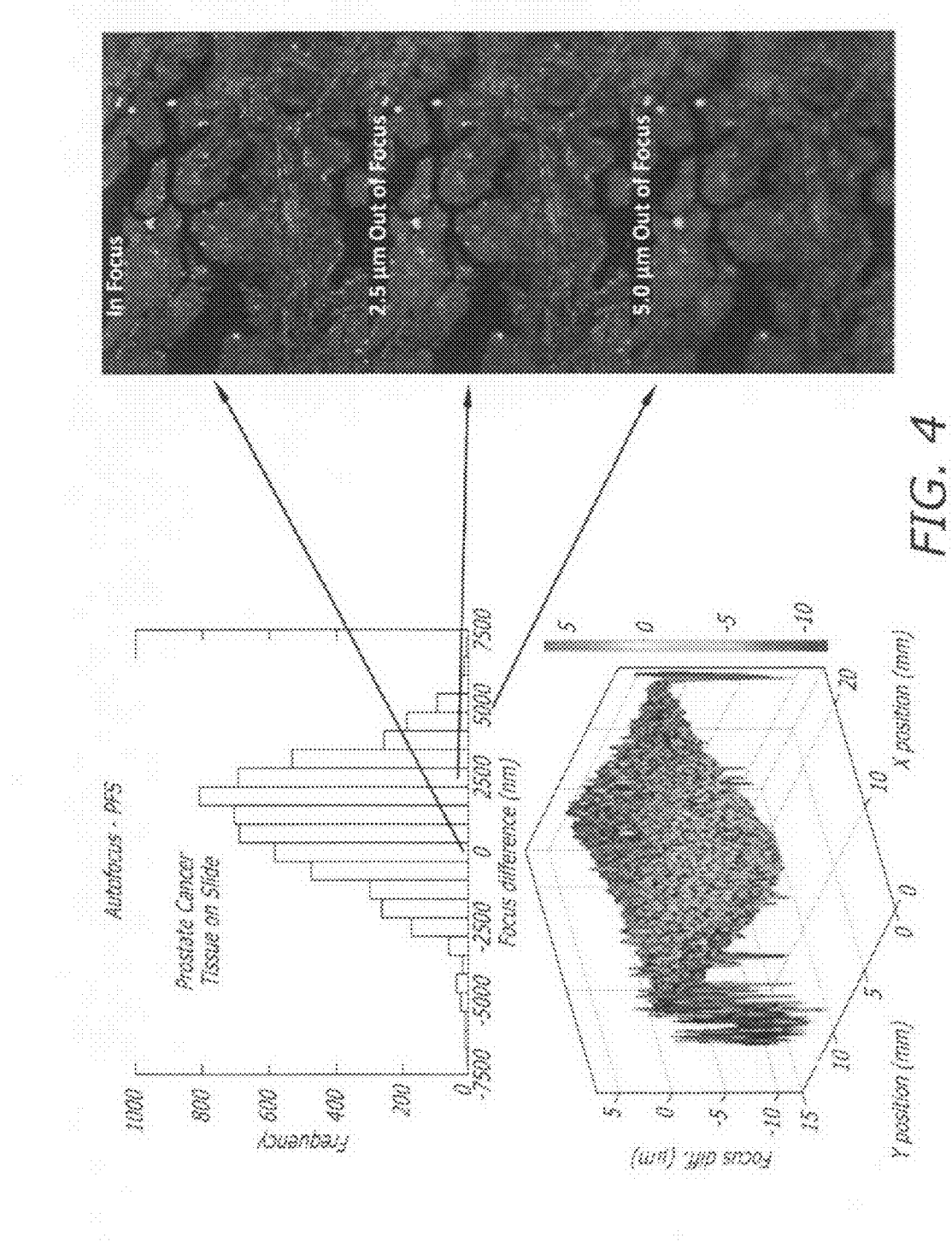
FIG. 4 is a set of representational illustrations showing differences in focus results between an image-based autofocus procedure and a reflective positioning procedure with respect to magnified images of a 5-μm section cut from FFPE prostate cancer tissue.
Figure 5:
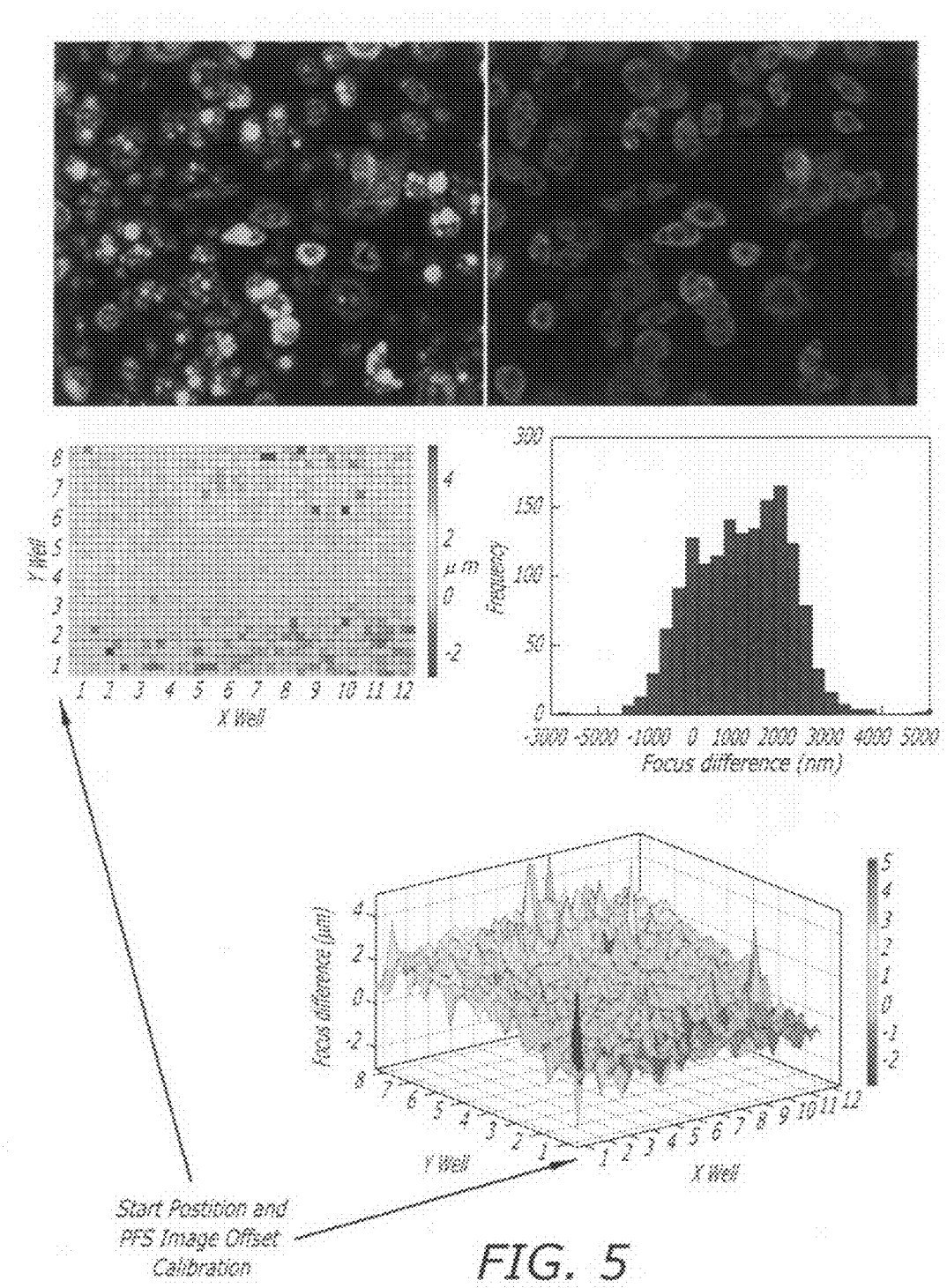
FIG. 5 is a set of representational illustrations showing differences in focus results between an image-based autofocus procedure and a reflective positioning procedure with respect to magnified images obtained from a 96-well microtiter positive control plate for screening for inhibition of lipid formation in adipocytes differentiated from 3T3-L1 cells.

An automated microscopy system equipped with a multifunction autofocus system having a multifunction autofocus construction and performing a multifunction autofocus method is now described with reference to certain preferred embodiments. Although the embodiments are set forth in terms of specific constructions, these constructions are intended to illustrate principles of multifunction autofocus, but are not intended to limit the application of those principles to the examples shown.

Multi-Focal-Plane Z-Positional Optics:

Image-based autofocus includes the established principle of placing camera sensors at various Z-axial positions to simultaneously collect images on an automated microscope at different focal planes. At any X-Y scan location, a specimen is imaged at a plurality of Z positions, thereby providing images of varying sharpness that provide information useful for determining a Z position providing a best-focused image. For example, U.S. Pat. No. 4,636,051 describes imaging three focal planes—a final focus position, one in front of it and one behind it—to perform image-based autofocus. U.S. Pat. No. 6,640,014 describes a multi-focal plane system based on fiber optic imaging bundles that collects nine different focal planes simultaneously for image-based autofocus in continuous scanning. This design scans images by using time-delay-and-integrate (TDI) cameras to image a constantly-moving specimen, but is fragile and difficult to calibrate. U.S. Pat. No. 6,839,469 describes a system based on beam-splitters that divide the light into eight paths to relay the images to eight different CCD cameras that are axially positioned by micrometers. This system maintains autofocus during continuous scanning and is easier to calibrate and use than the system described in U.S. Pat. No. 6,640,014. Prabhat et al. (Simultaneous imaging of several focal planes in fluorescence microscopy for the study of cellular dynamics in 3D, *Proc. SPIE* 6090, 60900L-60901-60907 (2006)) use a 4-camera multi-focal-plane imaging system to image fast events in live cells in 3D, including endosome dynamics to exocytosis at the membrane by direct imaging. While each of these implementations accomplishes the goal of imaging multiple focal planes simultaneously, they are cumbersome to implement, relatively expensive and the substantial glass and long light paths can degrade image quality.

Multi-Planar Image Acquisition Using Chromatic Aberration:

Another image-based autofocus method uses chromatic aberration to calculate a best focus position from images acquired at a set of Z-axially displaced focal planes. This method is described in cross-referenced U.S. patent application Ser. No. 12/587,923, now published as US 2010/0172020, which is incorporated herein by reference. (Counterpart PCT application PCT/US2009/005633 has been published as WO/US2010/044870). According to this method, light of different colors is focused to different points along the Z axis due to the wavelength-dependence of the refractive indices (dispersions) of lenses.

Figure 6:
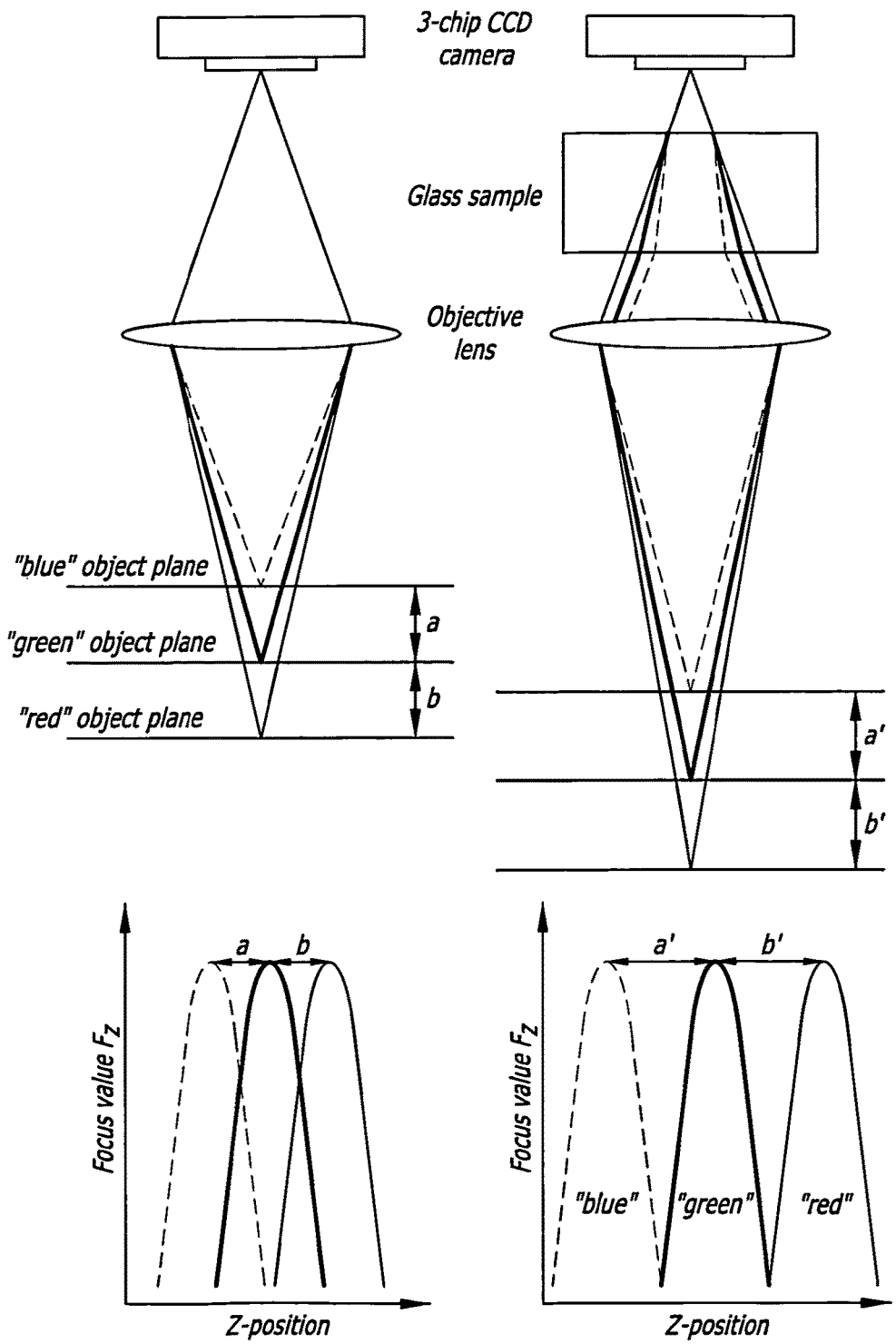
FIG. 6 is a set of plots showing chromatic aberration at red, green and blue wavelengths along with hypothetical differences in focus.

Chromatic aberration (or achromatism) is the focusing of light of different colors to different points due to the wavelength-dependence of the refractive indices (dispersions) of lenses. In this regard, see the diagrams of FIG. 6, which show chromatic aberration at red, green and blue wavelengths along with hypothetical differences in focus. The differences a and b are enlarged to a' and b' by adding a glass sample. The lower graphs show a schematic of the corresponding focus function curves and their shifts due to added chromatic aberration.

US 2010/0172020 describes a use of chromatic aberration to image multiple focal planes and speed up autofocus. According to the publication, differences in foci are controlled by planar glass samples inserted into the optical path in front of a CCD camera to alter chromatic aberration. In focus function calculations, the differences in best foci for each color with planar glass samples inserted were 0.35 mm (B), 0.9 mm (R), and 0.6 mm (G). To better detail chromatic aberrations, we have used the OneLight Spectra™ lamp (http://www.onelightcorp.com) for computer control of and mapped chromatic aberration for different optics. FIG. 7 illustrates chromatic aberration in three different Nikon® 20× objectives measured with and without the relay lens of FIG. 8. The focal shifts were measured in bright field for best focus with a 10-μm spacing micrometer. The image was magnified 1.5× by a Nikon® zoom lens onto a 640×480 camera (sampling of 4 pixels/μm). A) Nikon® Plan Fluor 20× 0.5 NA in Ph1 phase contrast. B) Nikon® Plan Apo 20× 0.75 NA in Ph2 phase contrast. C) Nikon® Plan Apo VC 20× 0.75 NA, which is corrected best. Autofocus was performed as previously described. Each curve was produced five times and the separation distance standard deviations ("SDs") were smaller than the data dots in the plots. These data indicate that: 1) chromatic aberration is present in each objective; 2) there are substantial differences between the objectives, and 3) the choice of wavelength can also be used to control the axial sampling distances.

Figure 9:
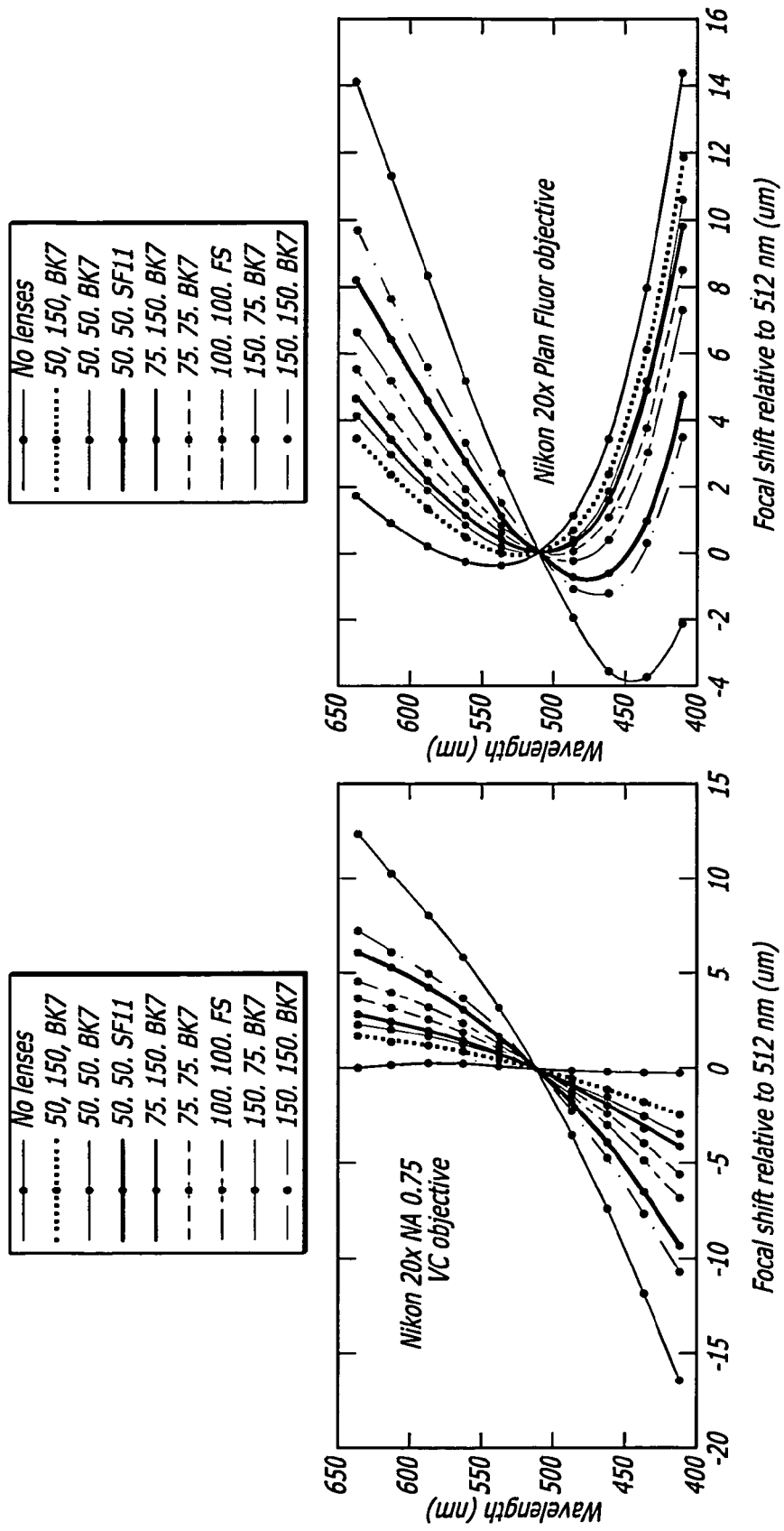
FIG. 9 is a pair of plots of chromatic aberration for two objectives with different combinations of lenses of different focal lengths and materials (with different dispersions) replacing the lenses in FIG. 8 to show control of chromatic aberration.

FIG. 8 is a schematic illustration of the relay lens used to control chromatic aberration in generating data for the plots of FIG. 7. A microscope side-port image was reimaged by lenses L1 and L2 onto a camera at a new camera image plane. A 1000 mm L0 cylindrical lens was added at a position prior to the light passing through lenses L1 and L2, to induce astigmatism so as to achieve results described below. Using the relay lens configuration of FIG. 8 to control chromatic aberration (without L0), we made the measurements shown in FIG. 9. Different focal lengths of three different types of glass (bk7, sf11 and fused silica, fs), which have different dispersions, were used with two of the objectives from FIG. 7: the Nikon® Plan Apo VC, which was best corrected for chromatic aberration and the Nikon® Plan Fluor, which was worst corrected. The differences between the two objectives demonstrate the desirability of designing an adjustable system to optimize the chromatic aberration for each objective. These data indicate that with both highly corrected and poorly corrected objectives, chromatic aberration can be controlled in a range more than sufficient for multi-planar axial sampling for autofocus.

Autofocus Performance Using Chromatic Aberration:

We performed two autofocus experiments with NIH 3T3 cells cultured on a coverglass, using methods described in Bravo-Zanoguera, M., Massenbach, B., Kellner, A. & Price, J. High-performance autofocus circuit for biological microscopy, *Review of Scientific Instruments* 69, 3966-3977 (1998), via incremental scanning with a 3-chip RGB camera operating at 30 fps and the relay lens of FIG. 8, with L1=L2=100 mm fused silica lenses. The chromatic aberration separation between each of the two color pairs was 2.25 µm. For the first experiment, there were four axial steps of 1.33 µm each for a total focus search range of 10 µm and for the second experiment there were three axial steps of 0.67 µm for a total test range of 8 µm. Repeat focusing 20 times on each of 100 fields yielded combined SDs of 157 nm and 132 nm, respectively. For the second experiment, removing two fields containing large bubbles reduced the SD to 43.3 nm. We also noticed that empty fields increased the SDs. Consequently, we added a test to prevent changing focus on empty fields.

Analogous experiments were carried out with an IMAGINGSOURCE® DB21AF04 firewire Bayer camera at 60 fps. The same experimental parameters were used, except the sample was imaged at 3 different mechanical positions 0.75 µm apart for a total sampling range of 6 µm, and empty fields containing <4% of the image content as measured by the upper half of the spatial frequency spectrum were eliminated. Two scans yielded combined SDs of 22.9 nm and 25.2 nm, respectively.

Figure 10:
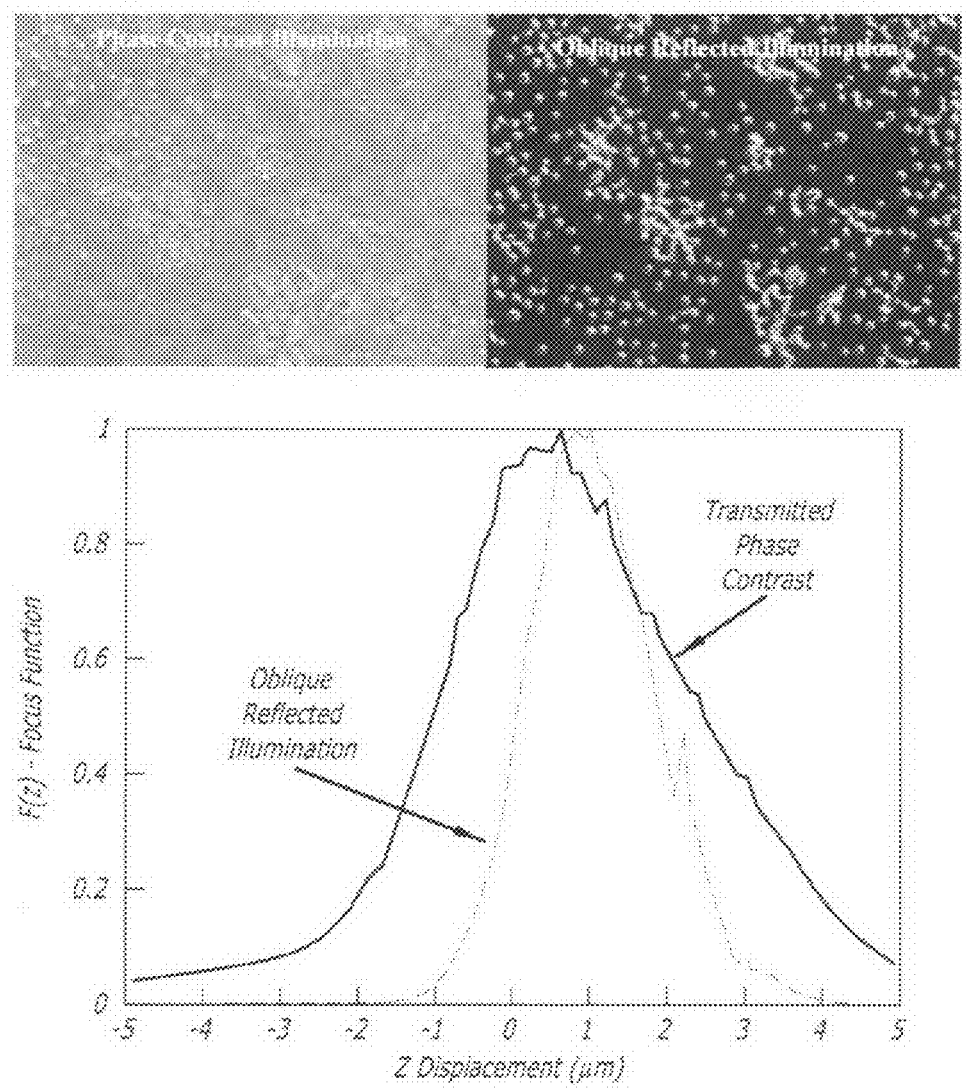
FIG. 10 is a set of representational illustrations showing images of cells acquired using oblique (over the objective) reflected illumination (top right) compared with phase contrast (top left) on MDA-MB-435 breast cancer cells suspended and centrifuged onto poly-L-lysine coated coverslips, and corresponding focus function plots (bottom).
Figure 11:
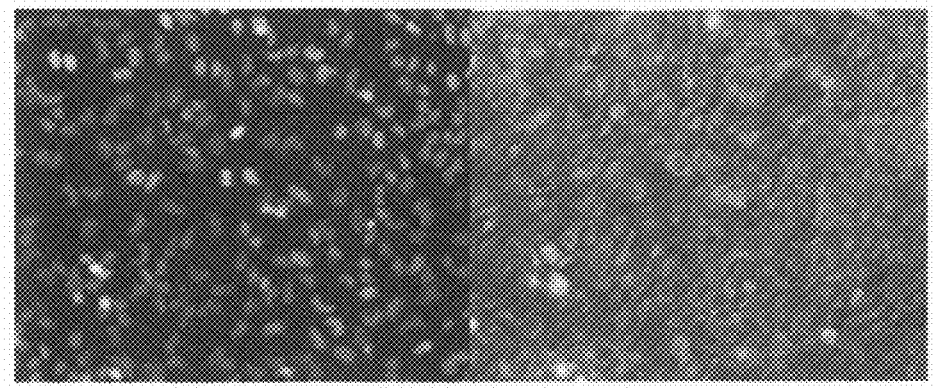
FIG. 11 is a set of representational illustrations showing images acquired using oblique (over the lens) reflected illumination (right) compared with fluorescence (left) on Hela cells from the beta-catenin screen in 384-well, membrane bottom microtiter plates, and corresponding focus function plots (bottom).

Oblique (Reflected) White Light Illumination for Autofocus on Microtiter Plates:

In some aspects, transmitted illumination using phase contrast of unstained cells performs better than fluorescence microscopy for autofocus. But the meniscus in the well of a microtiter plate acts as a lens and degrades the phase image to such an extent that it cannot be used for autofocus. Further, in the pharmaceutical industry, drug discovery screening often involves covering each plate with an opaque film. For these reasons, HCS instruments using image-based autofocus typically focus in fluorescence. FIG. 10 shows phase contrast and oblique reflected illumination images for the same field of view on NIH 3T3 cells cultured on a coverslip. Here, "oblique illumination" is defined as light directed from the side of the microscope between the objective and the specimen—an "over-the-lens" configuration. The corresponding focus function curves show that reflected oblique illumination may produce sharper focus function curves, possibly due to a higher effective NA (partial dark field effect). (Inoue, S. & Spring, K. R. *Video Microscopy, The Fundamentals*, (Plenum, N.Y., 1997)). FIG. 11 compares fluorescence and oblique reflected illumination on a Greiner® membrane-bottom microtiter plate. The setups were changed between illumination modes for both experiments, so best foci (focus function peaks) are not the same. As indicated by FIG. 11, oblique illumination produces high contrast images and normal focus function curves, indicating excellent characteristics for autofocus.

Figure 12:
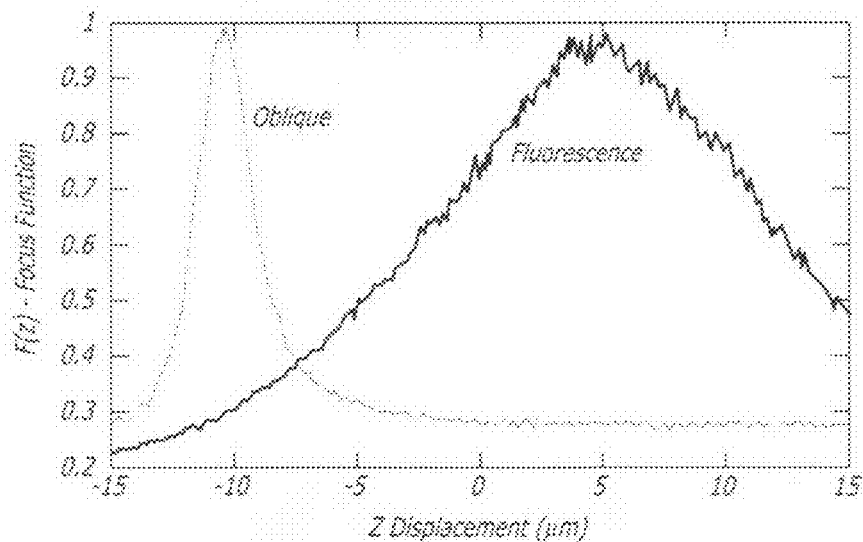
FIG. 12 is a representational drawing showing how astigmatism introduced by a relay lens creates different foci for rays propagating in perpendicular planes.
Figure 12:
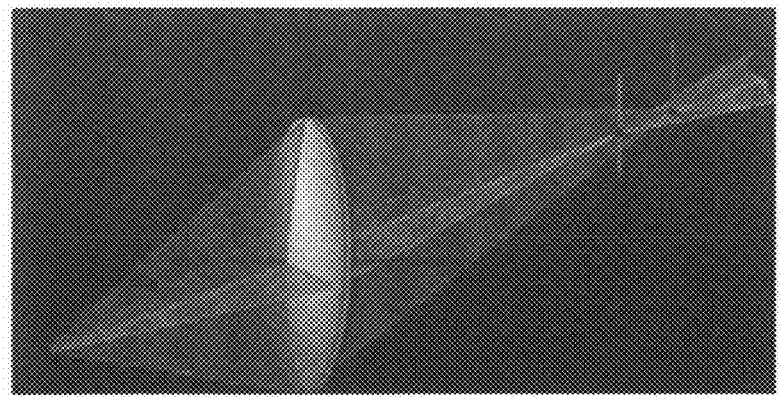

Doubling the Number of Focal Planes Using Astigmatism:

An optical system with astigmatism is one where rays that propagate in two perpendicular planes have different foci (see FIG. 12). If an optical system with astigmatism is used to form an image of a cross, the vertical and horizontal lines will be in sharp focus at two different distances (http://en.wikipedia.org/wiki/Astigmatism). Therefore, in some aspects of image-based autofocus, instead of utilizing only the horizontal video lines for calculating autofocus, we introduce astigmatism in order to create different focal planes for the horizontal and vertical video lines. Astigmatism has been exploited to achieve 3D super-resolution imaging by stochastic optical reconstruction microscopy (STORM) by inserting a cylindrical lens to produce two slightly different focal planes. (Huang, B., Wang, W., Bates, M. & Zhuang, X. Three-dimensional super-resolution imaging by stochastic optical reconstruction microscopy. *Science* 319, 810-813 (2008)). Astigmatism is also used in non-imaging surface tracking (reflected positioning) by laser illumination of CDROM disks (see, e.g., G. Bouwhuis, J. Braat, et al. Principles of Optical Disk Systems. Adam Hilger, Bristol and Boston, 1985; and S. G. Stan. The CD-ROM Drive—A Brief System Description. Kluwer, Boston, 1998). In an autofocus mechanism for automated microscopy that uses image characteristics of multiple focal planes simultaneously, we use astigmatism to create two sharpness measurements per Z-position. In some aspects of a multifunction autofocus mechanism and procedure for automated microscopy that combine reflective positioning with use of the image characteristics of multiple focal planes simultaneously via chromatic aberrations, we use astigmatism to create two sharpness measurements per color.

Figure 13:
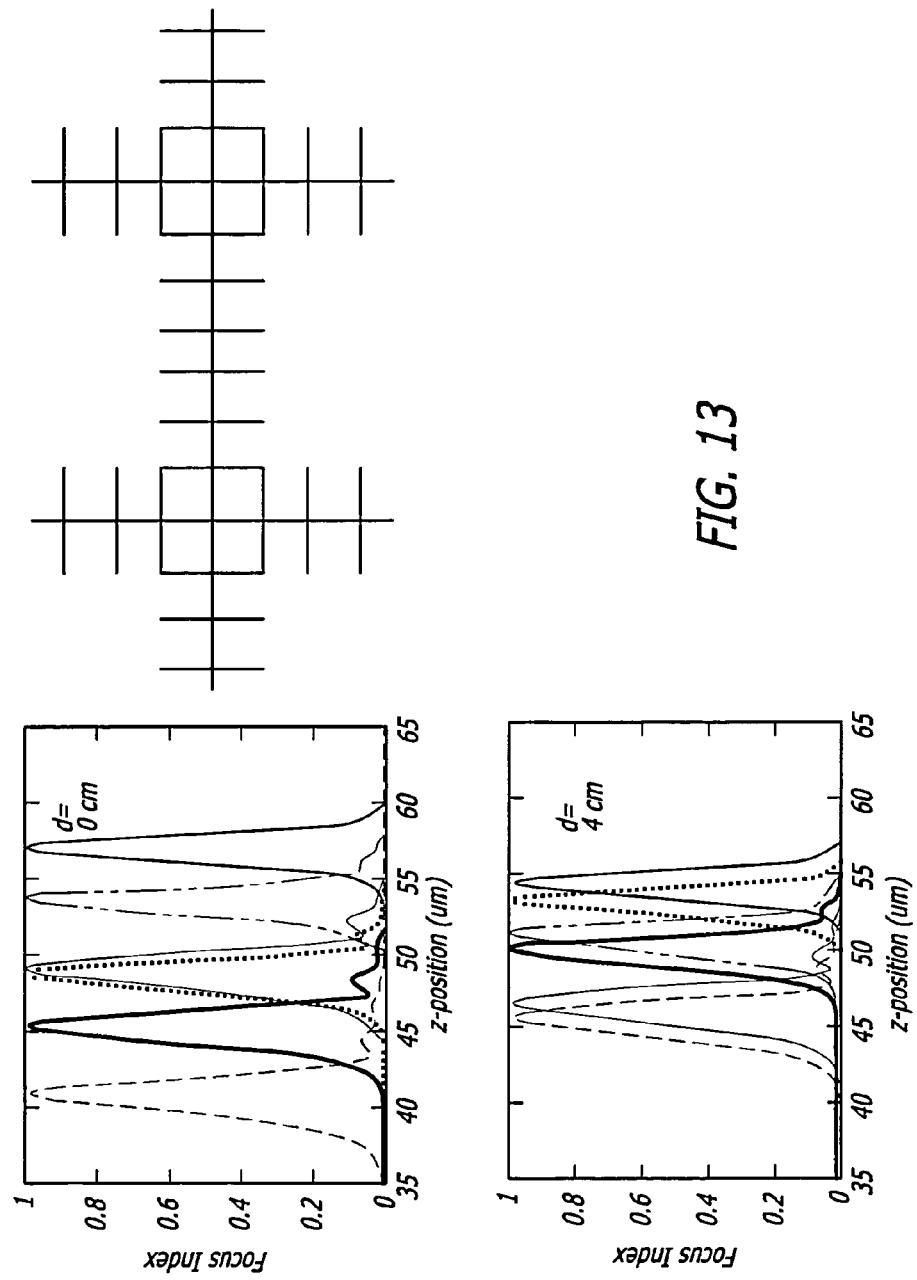
FIG. 13 is a set of representational illustrations showing astigmatism foci for various wavelengths with respect to the relay lens of FIG. 8.
Figure 14:
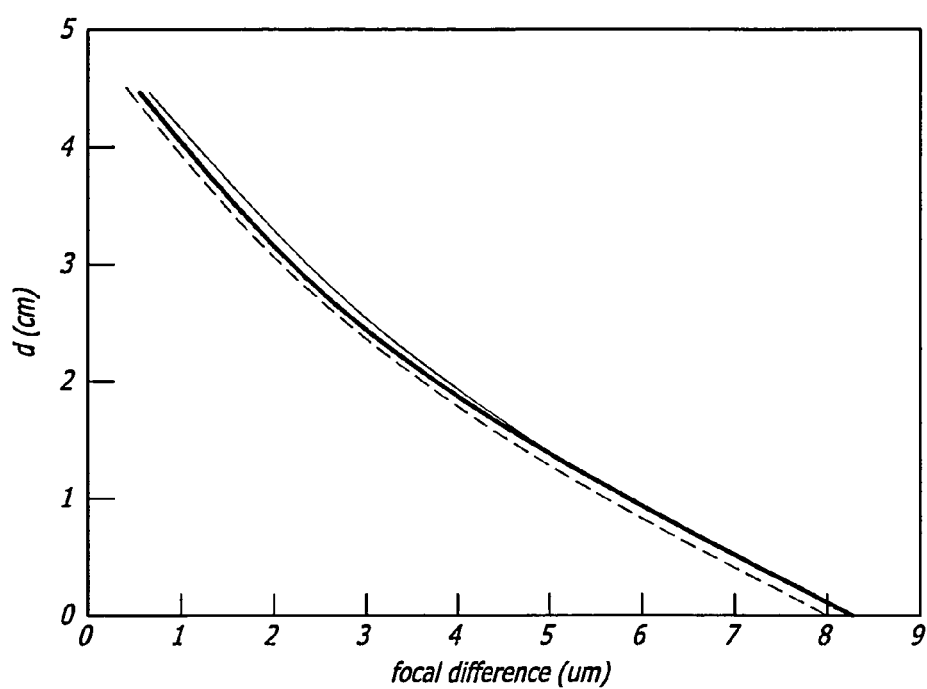
FIG. 14 is a plot showing the differences between two astigmatically-differentiated sets of RGB foci, with respect to adjusting the relay lens of FIG. 8.

Refer now to FIG. 13, in which astigmatic foci for RGB (450, 520, and 600 nm) at d=0 cm & d=4 cm from the relay lens (FIG. 8) are plotted (left). At d=0 cm the G foci of the test target are 8.3 µm apart and test target images at those two positions demonstrate $f_x$ (middle) and $f_y$ (right) in focus image components for the ability to measure two foci on the same image, and six foci on an RGB camera. To induce astigmatism, we placed a 1,000-mm focal length cylindrical lens before the chromatic-aberration-inducing relay lens (of FIG. 8) and created focus function curves using bright field for the RGB wavelengths by applying highpass filters in the horizontal and vertical image directions, $f_x$ and $f_y$, respectively. The astigmatism is greatest with L0 close to L1 (e.g., d=0 cm, top left in FIG. 13 and least with L0 furthest from L1 (d=4 cm, bottom left in FIG. 13). For green, the $f_x$ and $f_y$ foci are 8.3 µm apart (d=0), and the directional foci are clearly visible in the test target images at those positions (FIG. 13 middle and right). The data of FIG. 13 indicate that astigmatism is an effective method for creating multi-planar imaging for autofocus and that astigmatism and chromatic aberration can be combined in an image-based autofocus method for measuring degree of focus. In FIG. 14, the differences between the two sets of $f_x$ and $f_y$ RGB foci at each wavelength are plotted as a function of d, the distance of L0 from L1 in FIG. 8, demonstrating straightforward control of astigmatic multi-planar foci separation.

The data of FIGS. 13 and 14 indicate that astigmatism is an effective method for creating multi-planar imaging for autofocus, and that astigmatism and chromatic aberration can be combined in an image-based autofocus method for measuring degree of focus. We evaluated these indications by introducing astigmatism in series with two 3-chip RGB cameras for a 12-focal-plane set of sharpness measurements per position and scanned 1,918 fields of view of a prostate cancer tissue section using only one mechanical position per field (note that more than one mechanical position can also be used, if needed). The two RGB cameras were offset slightly axially to allow simultaneous sampling of twice the number of planes. Reflective positioning performing coarse focus kept the images in approximate focus and image-based autofocus refined focus on each field. The 12 planes were sampled about 0.63 µm apart for a range of 6.9 um. Fluorescent images were captured with a separate Hamamatsu® Orca ER camera. If fluorescent image brightness was <10% of the first field, only reflective positioning was used and scanning stayed on track. Chromatic and astigmatic aberrations were used to create 12-plane sharpness measurements and all 1,918 images acquired were in focus by inspection, demonstrating fast, optically efficient autofocus. These results indicate that chromatic and astigmatic aberrations are useful in combination to create multi-plane sharpness measurements.

Accordingly, a multifunction autofocus system or method for automated microscopy makes multi-planar image sharpness/resolution measurements using multi-planar image acquisition equipped with astigmatic aberration, in combination with reflective positioning to reduce the complexity of automated microscopy without adversely impacting its optical performance.

Figure 15:
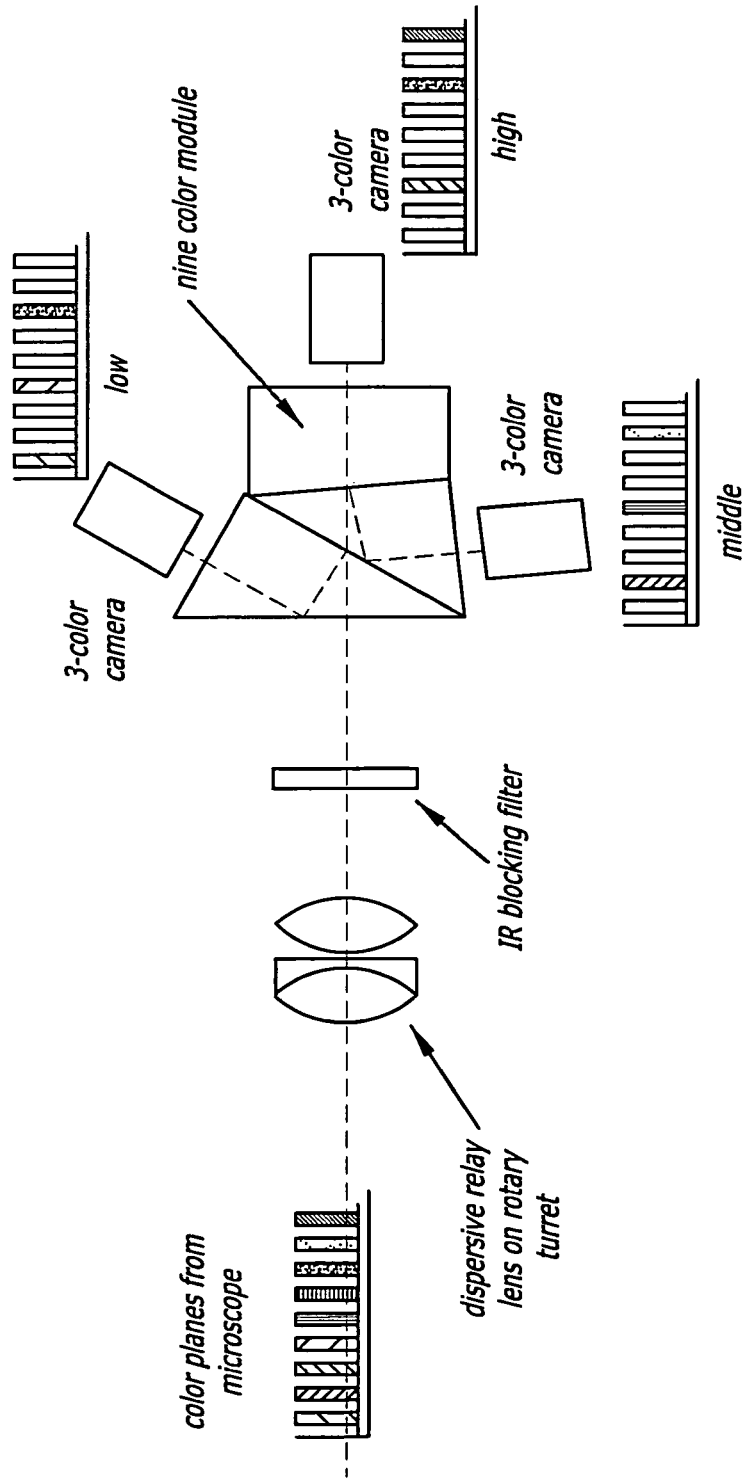
FIG. 15 is a schematic diagram showing a layout for a multi-plane color module along with distribution of multiple color sub-bands.

Implementations of Multifunction Autofocus:

Various implementations of multifunction autofocus include, without limitation, the following combinations:

Reflective positioning for coarse focus, in combination with image-based autofocus for fine focus as described elsewhere (examples include: Groen F C A, Young I T, Ligthart G: A comparison of different focus functions for use in autofocus algorithms. Cytometry 6:81-91, 1985; J H Price, D A Gough, "Comparison of Digital Autofocus Functions for Phase-Contrast and Fluorescence Scanning Microscopy," Cytometry, 16(4): 283-297, 1994; M Bravo-Zanoguera, B von Massenbach, A L Kellner and J H Price, "High Performance Autofocus Circuit for Biological Microscopy," Review of Scientific Instruments, 69(11):3966-3977, 1998);

Reflective positioning for coarse focus, in combination with image-based autofocus using chromatic aberration for fine focus based on multi-planar image acquisition using the lens configuration of FIG. 8 without the L0 cylindrical lens in which three (3) wavelengths of light are used to image three (3) focal planes simultaneously with a 3-color camera;

Reflective positioning for coarse focus, in combination with image-based autofocus using astigmatic aberration for fine focus based on multi-planar image acquisition using the lens configuration of FIG. 8 with the L0 cylindrical lens in which two (2) focal planes are imaged simultaneously with a greyscale camera, and two (2) additional focal planes per camera, for example to achieve: six (6) focal planes from three (3) cameras in the configuration of 4,636,051 and eight (8) focal planes from four cameras in the configuration of Prabhat et al. (Simultaneous imaging of several focal planes in fluorescence microscopy for the study of cellular dynamics in 3D, *Proc. SPIE* 6090, 60900L-60901-60907 (2006));

Reflective positioning for coarse focus, in combination with image-based autofocus using chromatic and astigmatic aberrations for fine focus based on multi-planar image acquisition using the lens configuration of FIG. 8 with the L0 cylindrical lens in which six (6) focal planes are imaged simultaneously with a 3-color camera;

Reflective positioning for coarse focus, in combination with image-based autofocus using chromatic aberration for fine focus based on multi-planar image acquisition using the optical configuration of FIG. 15, which shows a 9-color implementation using three 3-color cameras, each of which collects images at 3 different focal planes. This combination uses custom multiband prisms that integrate the triple color multiband interference filters with beam splitters. FIG. 15 shows the layout of the nine-focal-plane color module along with distribution of the color sub-bands distributed within each of the RGB bands of a trichroic prism. Nine focal planes (labeled by nine separate colors) from a microscope port pass through dispersive relay optics. Various relay optics are placed on a rotary turret so different optics can be selected depending on the microscope's configuration. An IR blocking filter is used if needed. The nine colors are separated into low, middle, and high bands by a three-prism element with integrated thin-film interference coatings. Each band goes to a separate three-color camera for detection;

Reflective positioning for coarse focus, in combination with image-based autofocus using chromatic and astigmatic aberrations for fine focus based on multi-planar image acquisition using the lens configuration of FIG. 8 in which placement of a cylindrical lens to the left of the relay lens introduces astigmatism for measuring sharpness/resolution of double the number of focal planes to bring the total to 18 focal planes with the "nine color module," optics and cameras of FIG. 15.

Figure 16:
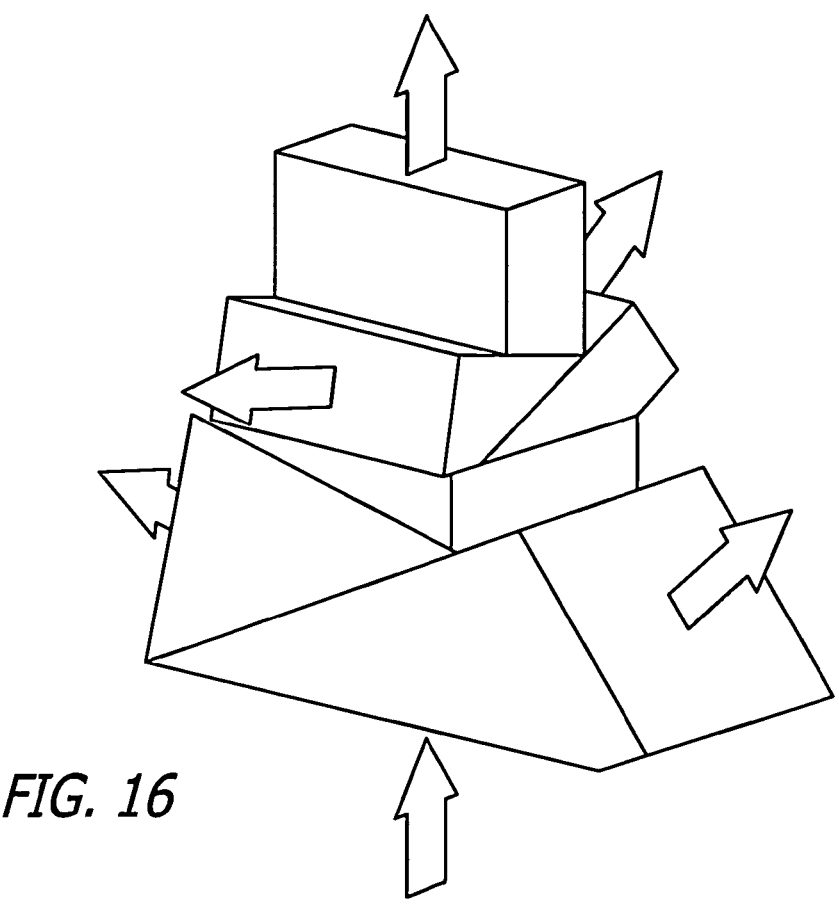
FIG. 16 is a schematic diagram of a five-color prism for creating a 5-color camera.

FIG. 16 shows a five-color prism for creating a 5-color camera, which could be used directly to measure the sharpness/resolution of five planes. With the cylindrical lens of FIG. 8, the sharpness/resolution of 10 image planes can be measured simultaneously.

The nine-color configuration of FIG. 15 can be modified so that the cameras are placed on actuators that move them along the optical axis. In this configuration, the nine color module is replaced with a triple beam splitter that divides the light three ways (33.3% of the light to each camera), and a triple bandpass interference filter is placed at the input of the triple beam splitter. The three cameras are then moved to different focal planes using the principle described in U.S. Pat. No. 4,636,051.

To transmit the light for image-based autofocus measurements in a multifunction autofocus for fluorescent microscopy, the wavelengths are chosen to be in the emission bands of the fluorescent colors so that they are passed through the microscope to one or more autofocus cameras. In one construction, a strobed illuminator is used to perform multiplane image acquisition for autofocus when a scientific grade imaging camera is not collecting the fluorescent image. When autofocus is complete (the fluorescent camera is in focus), the fluorescent light source is turned on (either electronically or via a shutter). There are various implementations that split out the autofocus light to the autofocus cameras and pass the fluorescent light to the fluorescent camera(s). For example, a dichroic mirror can be used to reflect the autofocus wavelengths and transmit the fluorescence wavelengths, or a movable mirror can be used. A "scraper" (FIGS. 17 and 26) can be used to image a field of view adjacent to the field of view of the scientific grade imaging camera. The scraper configuration also enables simultaneous fluorescence and reflected darkfield imaging, for example, to perform multifunction autofocus in continuous scanning (Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016, 2007.

A dichroic mirror can be used to reflect light out of the light path for autofocus. To avoid light losses when using the dichroic mirror, a movable mirror can be used that swings into place to reflect light for autofocus and swings out of the way to allow unimpeded transmission to the scientific camera(s) that acquire images for cytometric analysis. Alternatively, a "scraper" mirror can be used that images a field of view adjacent to the field of view imaged by the scientific camera(s). The scraper mirror location is shown in a diagram of the microscope optical system of FIG. 17, in which the layout of the scraper mirror is positioned in or near the image plane of the tube lens of the microscope. The scraper mirror reflects a field of view to the autofocus camera(s) that is adjacent to the field of view of the scientific camera(s).

Figure 18:
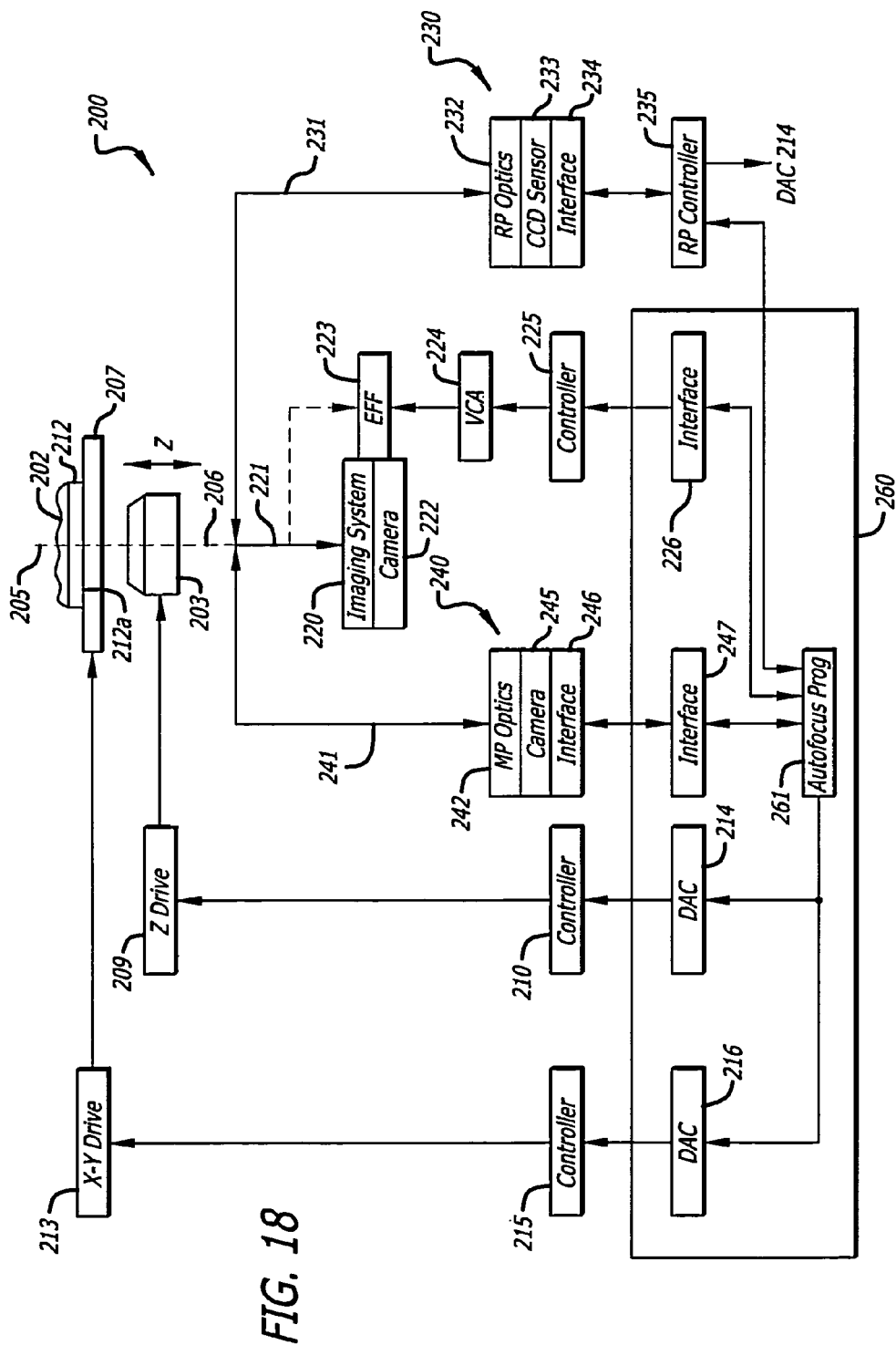
FIG. 18 is a block diagram of an automated microscopy system equipped with multifunction autofocus.

Representative Embodiment of Multifunction Autofocus:

A representative embodiment of an automated microscopy system 200 with multifunction autofocus is shown in FIG. 18. The multifunction autofocus system is equipped with reflective positioning for coarse focus and image-based autofocus using chromatic aberration and/or astigmatism for determining best focus based on multi-planar image acquisition. In some aspects, multi-planar image acquisition is the combination of chromatic aberration with astigmatism uses a lens configuration corresponding to that of FIG. 8. In FIG. 18, the automated microscopy system 200 is illustrated as having a particular objective/stage orientation and mode of relative movement therebetween. That is to say, the objective is positioned below the stage, and, for focus, the objective is moved along the optical axis relative to the stage. This is not intended to so limit the principles illustrated in this figure. In fact, the objective/stage orientation can be inverted so that the objective is above the stage. Further, the stage can be moved along the optical axis relative the objective for focus. Moreover, the objective and stage can each be moved along the optical axis for focus. Further still, the scientific camera(s) used to acquire images for cytometric analysis, or optics for those cameras, can be actuated to change the length of the light path for focus. Preferably, coarse focus is achieved using a reflective positioning procedure to move the stage and/or the objective, and fine focus is achieved by using a multi-planar autofocus procedure to move one or more of the stage, the objective, the camera and the moveable optics.

In FIG. 18, the automated microscopy system 200 acquires one or more images of a specimen 202 observed through a moveable objective 203. An optical axis 205 defines an optical pathway 206 having a line of sight through the objective 203. The specimen is supported on a motorized stage 207. For focus, the objective 203 is moved by a Z drive 209 bi-directionally along the optical axis 205 (in a Z direction). Preferably, but without limitation, the Z drive 209 constitutes a high precision stepper (or servo) motor driven by a digitally-operated controller 210 in response to signals received from a digital-to-analog convertor (DAC) 214. The specimen 202 is mounted on a specimen holder 212 to be supported thereby on the stage 207. For purposes of illustration, the specimen holder 212 is constituted of a microscope slide, but this is not intended to limit the principles described and illustrated herein. The specimen can be mounted to or in a multi-well microtiter plate, a petri dish, or any suitable equivalent. For scanning the specimen, the motorized stage 207 is moved by means of an X-Y drive 213 in the two dimensions (X and Y dimensions) of a plane that is intersected by the optical axis 205; in some aspects, the plane is orthogonal to the optical axis 205. Preferably, but without limitation, the X-Y drive is a pair of high precision stepper (or servo) motors driven by a digitally-operated controller assembly 215 in response to signals received from a DAC assembly 216.

As per FIG. 18, the automated microscopy system 200 acquires magnified specimen images for observation and analysis by way of an imaging system 220. Preferably, but not necessarily, the observed specimens are fluorescent and the imaging system 220 acquires magnified images via optical pathway 221 by a fluorescence mode of operation, using one or more scientific cameras 222. In some aspects, the imaging system 220 includes movable optics 223 that are at least partially external to (positioned outside of) the microscope tube and that can be actuated via a controller 224 to change the length of the light path for focus. In order to obtain well-focused images, the automated microscopy system 200 is equipped with a multifunction autofocus system including a reflective positioning system 230 and an image-based autofocus system 240. The systems 220, 230, and 240 are optically coupled to the pathway 206. Preferably, but not necessarily, the reflective positioning system 230 and the image-based autofocus system are coupled to the optical pathway 206 through respective optical pathways 231 and 241, by means of beam splitting mechanisms (not seen in FIG. 18). A control unit 260 includes programmable control mechanization for governing the functions of the systems 220, 230, and 240, including multifunction autofocus. The control unit 260 can be a part of a host computer (not shown), or a separate unit that is connected therewith.

Continuing with the description of FIG. 18, the reflective positioning system 230 includes reflective positioning (RP) optics 232, a CCD (charge-coupled device) sensor 233, and an interface 234 to an RP controller 235. The reflective positioning system 230 generates an optical image that travels via the optical pathway 231, 206, 203 to an object surface such as a surface 212a of the specimen carrier 212. The optical image is reflected from the object surface (bottom or top surface of, e.g., the slide, coverslip or plate bottom) and travels to the CCD sensor 233 via the optical pathway 203, 206, 231, 232. The reflected image is acquired from the RP optics 232 by the CCD sensor 233. The reflected image is converted and formatted by the interface 234 and conveyed to the RP controller 235. The RP controller 235, running in a closed loop mode, adjusts the Z position of the objective 203 via 214, 210, 209. In this manner, the objective 203 is moved along the optical axis by ±Z until the degree of focus of the reflected image reaches a preset threshold. When the preset threshold is reached, the automated microscopy system 200 is considered to be coarsely focused. When coarse focus is achieved, the RP controller 235 passes a value representing the current Z position of the objective 203 to a control mechanization autofocus program 261.

With further reference to FIG. 18, the image-based autofocus system 240 acquires images from a plurality of focal planes in order to determine a best focus location for image acquisition by the scientific camera(s) 222. A preferred construction includes mutiplanar optics 242 and one or more autofocus cameras 245. The multi-planar optics 242 are preferably constituted of chromatic aberration optics and/or astigmatic aberration optics. Preferably, each autofocus camera 245 includes a camera that acquires color images. Such a camera can be constituted of a single CCD chip "Bayer" camera (such as an IMAGINGSOURCE® DBK21AF04 CCD camera), or a multi-chip CCD camera (such as a SONY® DXC-9000). Alternatively, single color (greyscale) cameras can be used without chromatic optics to measure the sharpness of 2 foci per camera as would be provided by astigmatic optics. The image-based autofocus system 240 generates respective sets of images from respective sequences of focal planes. The members of each sequence of focal planes are separated along the optical (Z) axis 205. Preferably, the Z axis separation in each sequence results from chromatic and/or astigmatic aberrations inserted by MP optics 244. The MP optics 244 optically processes the light path so as to enable multi-planar focus sharpness measurements by CCD camera(s) 245. Each camera acquires images from one or more respective focal planes. The images acquired by the CCD camera(s) 245 are converted and formatted by the interface 246 and conveyed to an interface 247 in the control unit 260. The Z-separated images are received by the control unit 260 via an interface 247 and provided to the control mechanization autofocus program 261. The autofocus program 261 determines a degree of focus of each image plane (two degrees of focus for each image with astigmatic aberration), identifies the focal plane with the best-focused image, and operates the Z drive 209 via the DAC 262 and the controller 210. The Z drive 209 moves the objective 203 in ±Z to the location of the identified focal plane. When the identified focal plane is reached, the automated microscopy system 200 is considered to be finely focused.

Figure 19A:
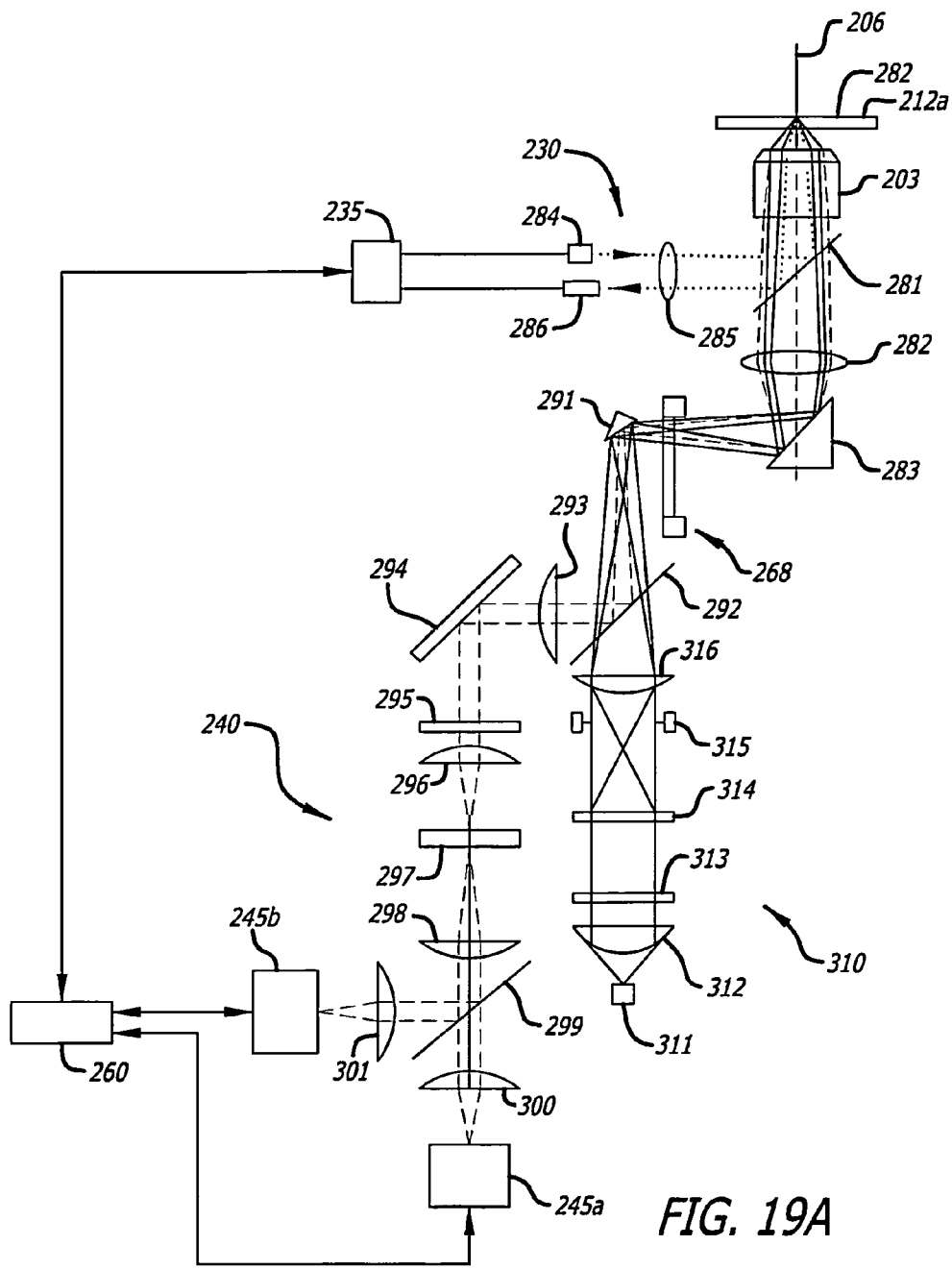
FIG. 19A is a schematic diagram illustrating a representative embodiment of an autofocus optical system with which the automated microscopy system of FIG. 18 can be equipped to support multifunction autofocus.
Figure 19B:
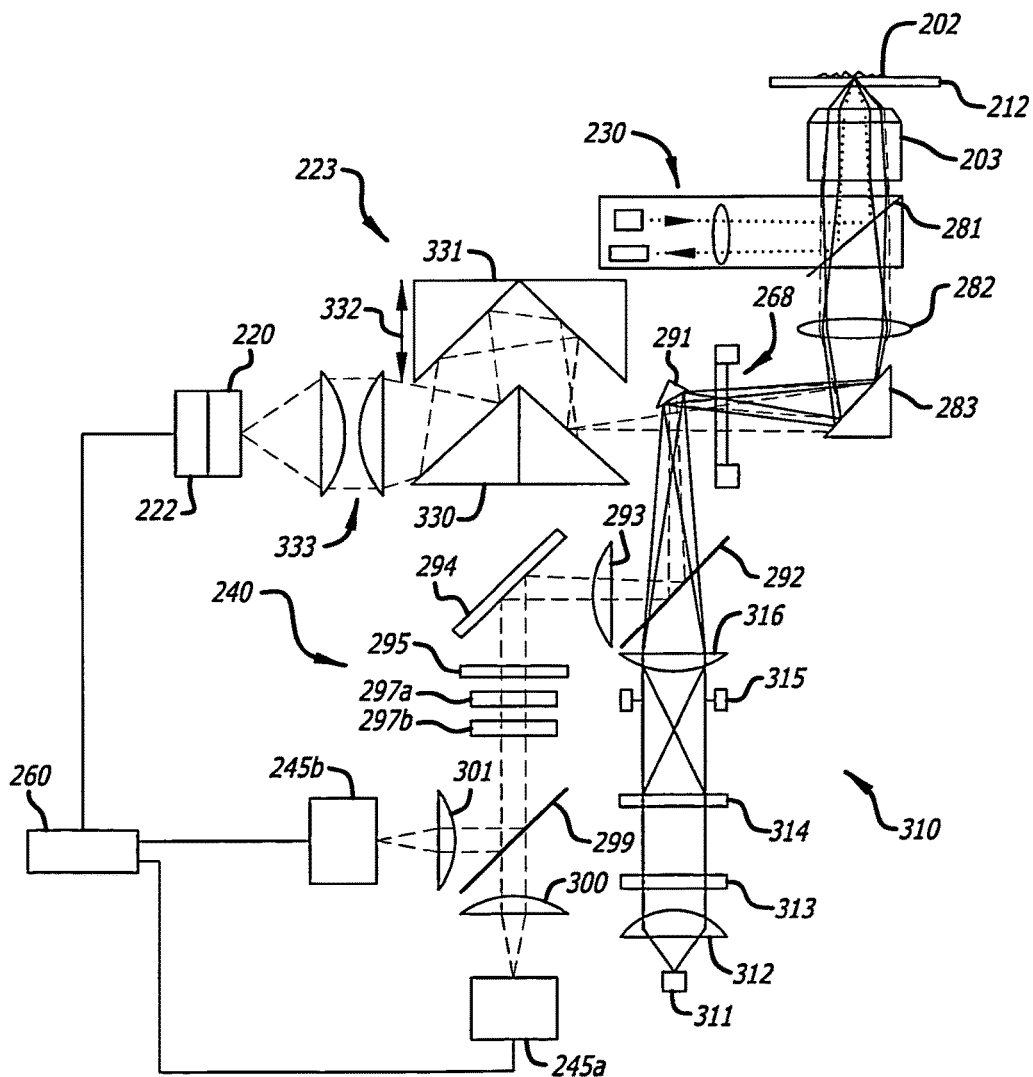
FIG. 19B is a schematic diagram illustrating another representative embodiment of an autofocus optical system with which the automated microscopy system of FIG. 18 can be equipped to support multifunction autofocus.

FIGS. 19A and 19B illustrate representative embodiments of optical subsystems with which the automated microscopy system 200 of FIG. 18 can be equipped to support a multifunction autofocus system with reflective positioning and image-based autofocus components. Both figures include reflective optics, multi-planar optics, and an optional dark field illumination system. FIG. 19B further includes elements of an external fast focus system for the imaging system 220.

With reference to FIGS. 18 and 19A, a multifunction autofocus optical system is equipped with a reflective positioning (first) optical system 230 and an image-based multi-planar (second) optical system 240. The first and second optical systems 230 and 240 acquire optical images from the optical pathway 206 via the objective 203. Light focused through the objective 203 is transferred to a dichroic mirror 281 that transmits visible light into a microscope tube (not shown). The light in the microscope tube is transferred through a microscope tube lens 282 to a prism 283 internal to the microscope. Preferably, but not necessarily, the first optical system 230 operates with infrared (IR) illumination provided by an IR source 284, such as a light-emitting diode (LED). The infrared light emitted by the LED 284 is shaped by image-forming optics 285 into an image that is reflected by the dichroic mirror 281 to the objective 203. The image formed by the IR light is transferred through the objective 203 toward the specimen holder 212. The image-forming IR light is reflected from the focal plane defined by a surface 212a, and travels through the objective 203 to the dichroic mirror 281. The dichroic mirror 281 reflects the returning IR light through the image-forming optics 285. A mirror (not shown) reflects the returning IR light to an IR detector 286, which senses and digitizes the reflected image. The RP controller 235 processes the digitized reflected image to determine the degree of focus of the reflected image at the surface 212a. The surface 212a is selected according to design and operational requirements; in FIG. 19A, the surface 212a is an upper surface that is shown for illustration only and is not intended to be limiting.

Figure 17:
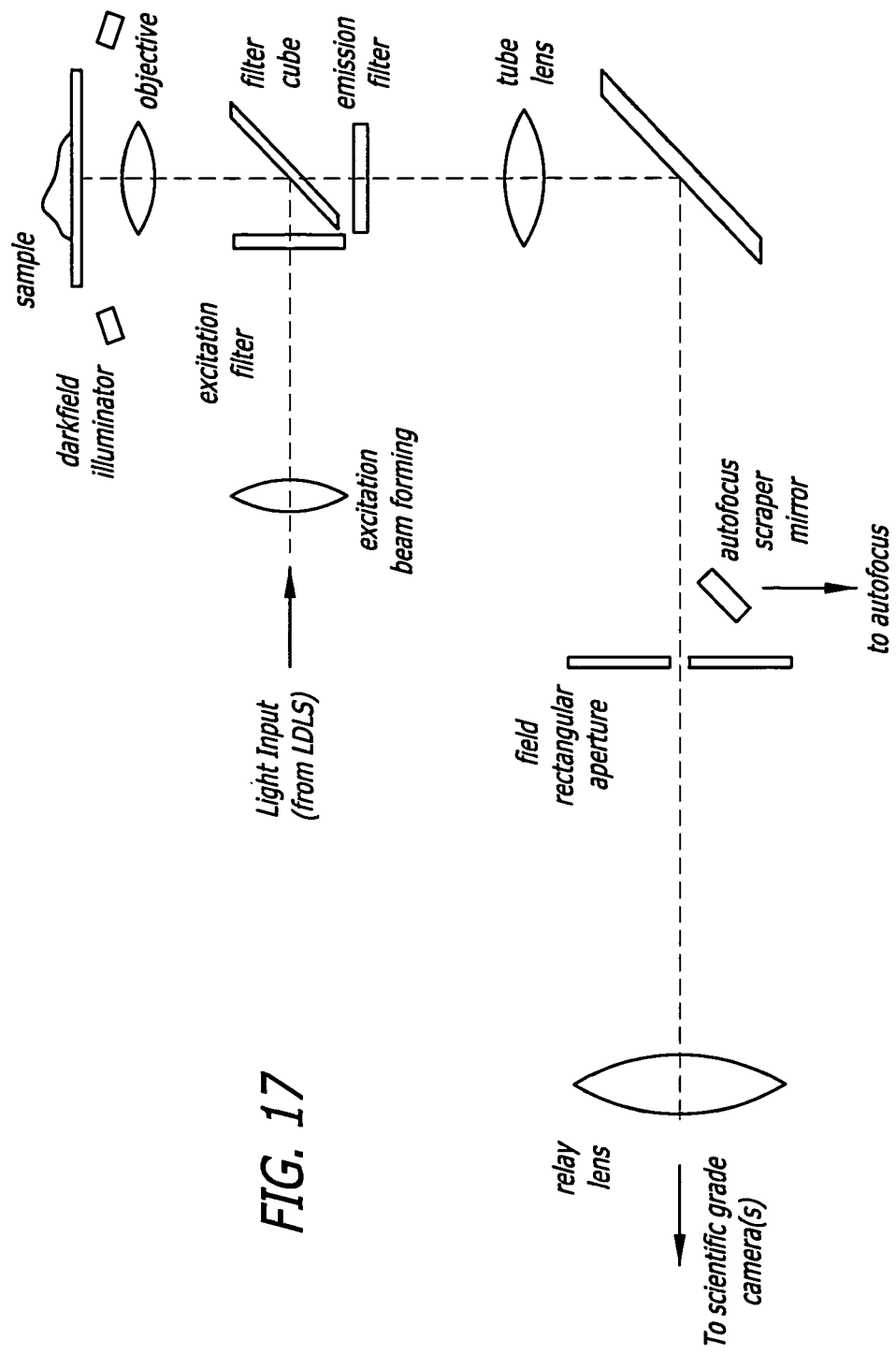
FIG. 17 is a schematic diagram of microscope optics showing the layout of an autofocus scraper mirror in the image plane of the tube lens of the microscope.

With further reference to FIG. 19A, the second optical system 240 acquires a sequence of focal plane images for best focus determination via reflection from the prism 283 to a scraper mirror 291 that images a field of view adjacent to the field of view imaged by the scientific camera(s) 222 (not shown) of the imaging system 220. In some aspects, the scraper mirror 291 can be positioned with respect to the optical axis as illustrated in FIG. 17. Preferably, but not necessarily, a specimen mounted in or on a specimen holder is illuminated by a dark field mode; in some aspects, the specimen is illuminated by a reflected dark field mode in which the objective 203 operates as both a condenser that focuses light toward the specimen and as an objective that focuses light scattered from the specimen to produce an image. Preferably, but not necessarily, the scraper lens 291 is employed to direct dark field illumination produced by a dark field illumination system 310 into the optical pathway 206 via the prism 283 for illuminating the specimen, and to transfer dark field illumination forming an image from the optical pathway 206, via the prism 283, into the second optical system 240. While scraper lens 291 has the advantage of both not degrading light to the scientific grade camera (not seen in FIG. 19A) and not requiring an actuator to remove and replace it, it can be replaced with a beamsplitter (which can degrade light to the scientific grade camera) or an actuated mirror that can be inserted and removed.

As per FIG. 19A, dark field light forming an image is reflected from the scraper mirror 291 to a pellicle mirror 292 whence it passes through an achromatic spherical lens 293 to a folding mirror 294. The dark field light is reflected from the mirror 294 through an imaging mask 295 and then passes through an achromatic spherical lens 296. The dark field light is transferred by the achromatic spherical lens 296 to a cylindrical lens 297. From the cylindrical lens 297, the dark field light travels through a plano-convex spherical lens 298 to a 50-50 cube beam splitter 299. Half of the dark field light travels from the beam splitter 299 through a plano-convex spherical lens 300 to one CCD camera 245a; the other half of the dark field light travels from the beam splitter 299 through a plano-convex spherical lens 301 to the other CCD camera 245b.

Astigmatic aberration is introduced into light reaching the CCD cameras 245a and 245b by the cylindrical lens 297. Preferably, the cylindrical lens 297 is one of a plano-convex, plano-concave, biconvex, or biconcave lens. The effect of the astigmatism is to cause light received by the multi-planar optics to propagate differently in two perpendicular (X and Y) planes to at least one, but preferably to both of the CCD cameras 245a and 245b.

Chromatic aberration is introduced into light reaching the CCD cameras by lens relationships corresponding to the lens relationship illustrated in FIG. 8. In this regard, the lens pair 298, 300 introduces chromatic aberration into the light transferred to the CCD camera 245a, while the lens pair 298, 301 introduces chromatic aberration into the light transferred to the CCD camera 245b, respectively. Preferably, each camera images six focal planes: two astigmatically-induced transmission planes for each of three chromatically-induced planes. Further, the lens/camera spacings 300/245a and 301/245b differ slightly so that the cameras themselves are at different focal planes. Thus, each camera generates images from six different focal planes than the other camera. The result is six magnified images from twelve different focal planes, wherein each of the six (6) images contains $f_x$ and $f_y$ information from different focal planes.

An alternative embodiment of the second optical system 240 illustrated in FIG. 19B eliminates elements 296 and 298 of FIG. 19A (for increased optical efficiency and image resolution) and splits element 297 of FIG. 19A into two half cylindrical lenses 297a and 297b for greater astigmatism control. The preferred embodiment for introducing astigmatism is to assemble the lens pair 297A/297B using one plano-concave and one plano-convex cylindrical lens that can be moved relative to each other. This creates a compound cylindrical lens that has a longer focal length than currently-available cylindrical lenses. Of course, if a cylindrical lens can be made flat enough (long enough focal length), the preferred embodiment would use only one cylindrical lens.

Illumination for the second optical system 240 of FIGS. 19A and 19B can be provided by a dark field illumination system 310 that includes a white light source 311 (preferably a light-emitting diode) whose output light is collimated by a condenser lens 312. The collimated white light is filtered by a multi-band transmission filter 313, and then filtered, collimated light travels through an illumination mask 314, an iris 315, and a plano-convex spherical lens 316. The filtered, collimated light is transferred by the lens 316 through the beam splitter 292 to the scraper mirror 291, whence it is reflected into the optical pathway 206 toward the objective 203.

As per FIGS. 19A and 19B, the second optical system 240 and the dark field illumination system 310 operate cooperatively to obtain images from multiple focal planes for image-based autofocus processing without interfering with the operations of the imaging system 220. In this regard, the spatial filters 314 and 295, and the beam splitter 292 provide high angle illumination from the objective 203 and observe the low angle scattered light from the specimen. In this regard, the lenses 316 and 293 create focal planes conjugate to the back focal plane of the objective 203. In the dark field illumination system 310, the illumination mask 314 transmits an annular illumination profile corresponding to higher angle (higher NA) illumination of the specimen. The inner and outer radii of this transmitted light ring are dependent on the objective 203 being used and the lens 316 being used to generate the focal plane conjugate to the back focal plane of the objective. The outer radius is set to be as large as the back focal aperture of the objective 203 at a conjugate focal plane external to the microscope. The inner radius is selected such that the annular ring is approximately 50% of the area of a back focal aperture at the conjugate focal plane external to the microscope. For example, if the back focal aperture of the objective 203 generated at the external focal plane has radius r1, then the annular ring has outer radius r1 and inner radius r2 such that $((r1)^2-(r2)^2)/(r1)^2=0.5$, and solving yields $r2/r1=\sqrt{0.5}=0.71$. In practice, r2/r1 is optimized experimentally in a range of about 0.4<r2/r1<0.8. This corresponds to illuminating with only the high NA portion of the objective 203. Conversely, the mask/stop combination 295 includes a hole that transmits all light that is scattered, but not directly reflected, by the specimen. The radius of this hole should be slightly smaller than r2 of the annular mask 314 on the illumination side, such that the two masks 295, 314 can be easily aligned so as to reject all directly reflected light, while collecting as much of the scattered light as possible. Ideally the two radii would be the same, but in good practice, the radii should to be at least 0.1 mm different due to alignment and aberrations of the optics. This corresponds to imaging with only the lower angle (lower NA) portion of the objective 203.

The principles of reflective dark field illumination are basically the same as in transmissive dark field illumination except the light now comes from the same direction. Accordingly, the beam splitter 292 is used to divide the illumination and imaging paths; for this, we prefer a 45/55 (50/50 ideal, if available) pellicle beam splitter. It is desirable to minimize optics on the objective side of this beam splitter because back reflections off of optical elements can interfere with the imaging. We prefer the pellicle beam splitter because both plate and cube beam splitters have back reflections and ghosting that interferes with the imaging and alignment of masks/stops.

External Fine Focus:

With reference to FIG. 18, the automated microscopy system 200 includes an alternative fine focus system for finely focusing a scientific camera 222 in response to a best focus. This fine focus system includes optics that are at least partially external to (positioned outside of) the microscope tube, and so it is denominated as an external fine focus (EFF) system 223. As seen in FIG. 19B, the light traveling through the EFF system 223 from the microscope side port 268 is relayed by imaging relay optical system 333 to the imaging system 220, and thereby to the scientific camera 222. The EFF system 223 provides fine focus by moving the mirror assembly 331 relative to the mirror assembly 330 as indicated by the arrow 332, thereby shortening or lengthening the light path to the scientific camera 222. Preferably, the mirror assembly is driven by a voice coil actuator (VCA) 224 governed by a controller 225 that interfaces with the control unit 260 via 226. At least two advantages are gained with EFF. First, microscopes, by definition, form a magnified image of a sample on a detector (camera) by using a magnifying objective and lens pair aligned via the microscope tube on the Z axis. Since the axial magnification (along the Z-axis) is proportional to the square of the transverse magnification (e.g., for an objective with transverse magnification of 20×, the axial magnification is 20*20=400×), adjustments of the optical path length in the sample plane translate to very small adjustments (by $1/Mag^2$) in the sample plane. For example, adjusting the optical path by 100 um in the sample plane, would translate to adjusting the sample plane by $((100\ um)\times(1/(20)^2)=0.25$ um. This results in more relaxed mechanical resolution requirements for an actuator that is used in the EFF as compared to one that would move the objective or the stage. Second, autofocus requires a Z-axis positioner to control and adjust the Z position of the objective or the sample. In a traditional microscopy platform, controlling the objective position in a fast and reliable manner can present a challenge because of non-standardized or custom control mechanisms. Using EFF to focus independently of a particular microscope platform offers the advantage of modularity where the same module could be used for other microscope platforms. Moreover, the specifications of the EFF system can be independent of the platform used. Using the EFF system allows the fine adjustment of the focus outside of the microscope. This functionality, in combination with multi-planar autofocus measurement, enables the design of a platform-agnostic autofocus module.

Multifunction Autofocus Operations:

Image-based autofocus involves determining a focus index, and, from the focus index, selecting the point, usually the maximum, that corresponds to best focus. Preferably, the focus index f(z) is determined by calculating the relative amount of mid to high frequency content present in the image of the sample for various z-positions of the sample. In this regard, see, for example, Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007). A power-weighted average is then used to calculate best focus $$W_\alpha = \frac{\sum_z z f_z^\alpha}{\sum_z f_z^\alpha} \qquad (2)$$

where, for example, $\alpha=8$ is used as the weight for best focus here. The calculation of the focus index is achieved by using a band pass convolution filter h(x) along the horizontal dimension x of each image $i_z(x, y)$ at each axial position z $$f_z = \frac{\sum_x^n \sum_y^m [h(x) \otimes i_z(x, y)]^2}{\left[\sum_x^n \sum_y^m \frac{i_z(x, y)}{nm}\right]^2} \quad (3)$$

Calibration:

In previous work, a 31-tap bandpass filter was designed that worked well for many samples given that the camera was sampling at 1.45 times the Nyquist cutoff frequency of the imaging system. (Oliva, M. A., Bravo-Zanoguera, M. & Price, J. H. Filtering out contrast reversals for microscopy autofocus. *Applied Optics* 38, 638-646 (1999)). But since the choice of objective, relay lens, and cameras creates different magnifications and sampling for different experimental setups, we implement a fast calibration step that includes optimization of the upper frequency band for the sharpness measurements. First, the power spectrum is calculated across one dimension of an image, and the mid to high frequencies are summed to give a focus index ($f_z$):

$$f_z = \sum_{v=v_1}^{v_2} \sum_y w_v f_{y,v} \quad (4)$$

with $$f_{y,v} = \left|\sum_x i(x, y) e^{-\frac{2\pi i}{N} xv}\right|^2 \quad (5)$$

Where $f_{y,n}$ is the power spectrum of each line of the image along one dimension, N is the number of pixels in the x-direction, and $w_n$, is the weighting used for each frequency n (in this example $w_n=1$ for all n).

Using the power spectrum of each line, we expand on the principal concept of summing the mid to high frequencies by implementing rapid tuning of the filtering characteristics for different samples and optical configurations. The frequencies used in the sum of Eq. 4 are fine tuned differently than the upper-half of the frequency spectrum for each optical setup based upon two criteria: 1. the focus function is unimodal (with only one peak); and, 2. the mathematically determined focus agrees with the best focus determined by eye.

The power weighted averaging is the same as in Eq. 2. This technique allows tuning of the filter conditions rapidly for different samples, objectives, magnifications, and pixel size of the camera. This is especially convenient when a change in objective or camera results in a substantially different sampling rate relative to the Nyquist frequency.

Figure 20:
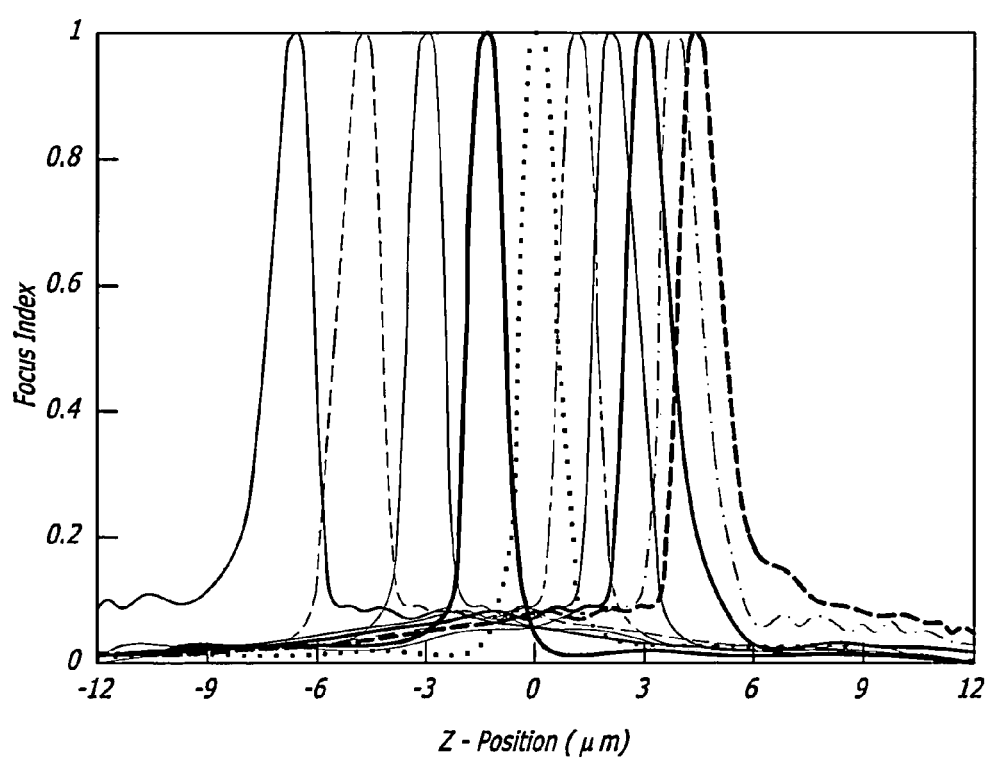
FIG. 20 is a plot illustrating wavelength selection used for controlling focal plane spacing.

In order to utilize the information from different colors to determine best focus a calibration is performed to relate the focus information from the different colors relative to one another. In this regard, see FIG. 20 which shows function curves for a Nikon® 20× 0.75 NA Plan Apo VC objective used in combination with a relay lens configuration according to FIG. 8 (L1=L2=100 mm fused silica lenses) plotted for wavelengths of 412-637 nm in 25 nm steps. These plots illustrate how the wavelength selection can also be used for controlling the spacings of focal planes. For a given color, the focus index for a specific Z-position of the sample is meaningless unless the full through-focus normalized index f(z) is measured. The normalized focus function curves plotted in FIG. 20 require both a shift to set the minimum of the curve at 0 and a scale to set the peak at 1 of the raw index $f_r(z)$. This is implemented as:

$$f(z) = \frac{f_r(z) - \min(f_r(z))}{\max(f_r(z)) - \min(f_r(z))} \quad (6)$$

The shift is the subtraction of the minimum and the scale is division by the maximum minus minimum. The shift and scale for different colors can have largely different values, thus without some form of calibration, a larger focus index value at a given sample z position for one color does not necessarily imply it is in better focus than another color.

This calibration is carried out for each focal plane produced by astigmatism ($f_x$ and $f_y$ in FIG. 15) in each image. As written, equations 3-6 apply to the horizontal spatial frequencies ($f_x$). For multi-planar sampling via astigmatism, they are applied to both the horizontal and vertical spatial frequencies ($f_x$ and $f_y$). Equations 3-6 can be applied to the vertical frequencies ($f_y$) as is by first rotating the images 90 degrees.

To calibrate for a multi-field scan, a full through-focus function curve is acquired for the three wavelengths at the first field. Then the shift and scale from these curves are applied to the focus indices for the corresponding wavelengths in all subsequent fields. Similarly, the calibration also serves to determine the relative focal shift of the different colors. This calibration makes three assumptions: 1. the content of each field is comparable to the calibration field; 2. the image content at each wavelength is proportional to the number of cells being imaged; and, 3. the shape of each focus function curve at each wavelength is similar.

With respect to the second and third conditions, if the information in a given wavelength channel is not strongly correlated with the information in another channel, the calibration can fail, in which case chromatic aberration cannot be used to find focus in subsequent fields. This could occur if the sample is inhomogeneous in a manner that creates wavelength-dependent absorptions and those inhomogeneities vary substantially from field-to-field.

During the scan, occasional fields are encountered that contained few or no cells to focus on. If the sum of the high frequencies used in Eq. 8 is <4% of the sum of the high frequencies in the best-focus image of the calibration field, the field is skipped and marked as blank. This also prevents the scan from deviating too far from the contour of focus positions on the slide when encountering empty fields.

Figure 21A:
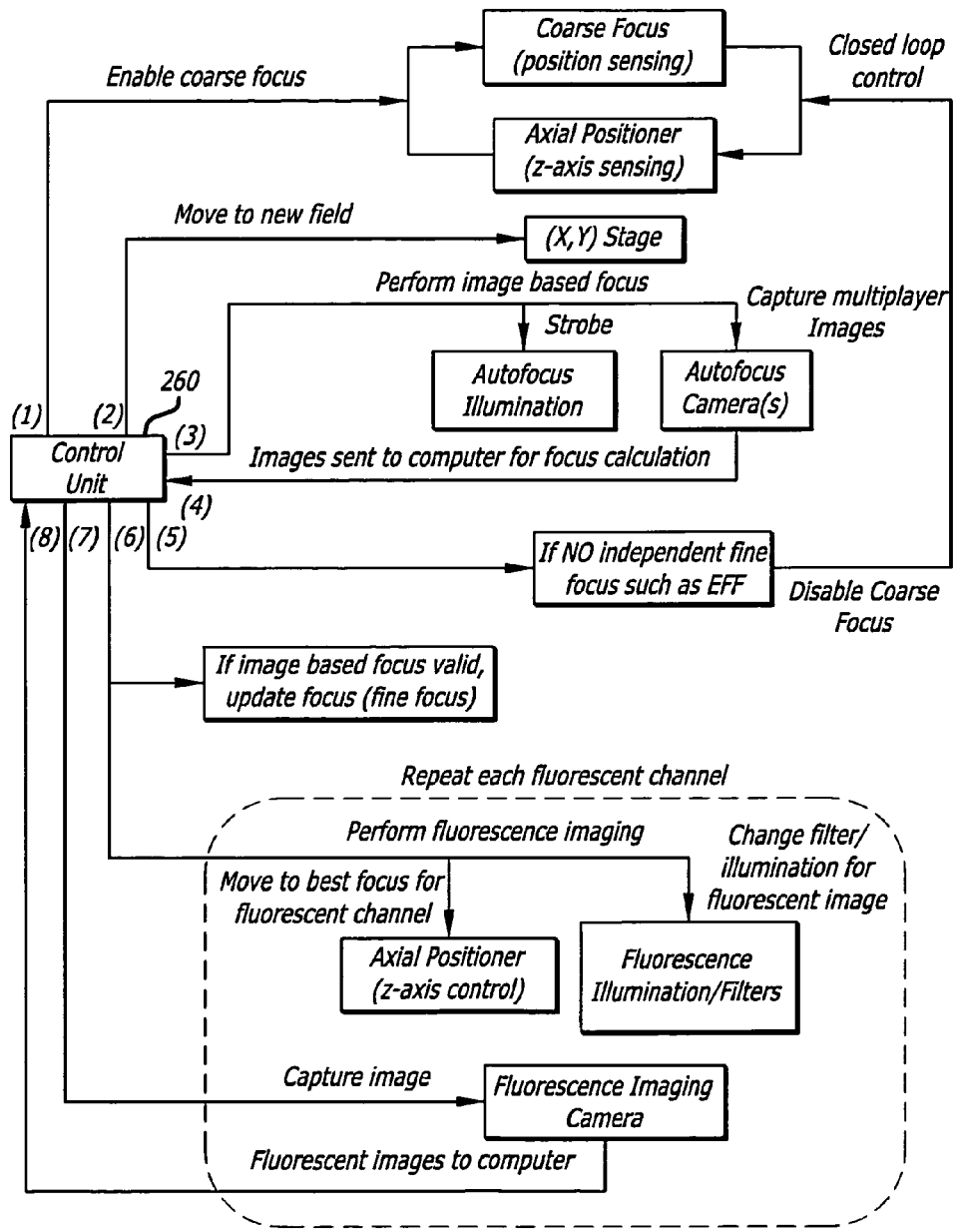
FIG. 21A is a flow diagram illustrating a method of operating an automated microscopy system using multifunction autofocus during incremental scanning.

Multifunction Autofocus Methods:

FIG. 21A illustrates a method of operating an automated microscopy system equipped with multifunction autofocus and governed by a control mechanization including a controller. The automated microscopy system 200 of FIG. 18 is used to illustrate the method, but is not intended to limit application of the method to other automated microscopy systems. Further, the system is described as operating in an incremental scanning mode, although this is for illustration only and is not intended to prevent application of the method to other modes of operation.

Per FIGS. 18 and 21A, the control unit 260 includes autofocus programming 261 that is constructed to govern the operations of the system 200, including coarse and fine focusing procedures, by use of the reflective positioning system 230 and the image-based autofocus system 240. A specimen is mounted to the stage 207 (manually, or by robot or equivalent) and the control unit 260 automatically operates the system 200 according to the method of FIG. 21A, which includes the following steps, executed by the automated microscopy system under governance of the control unit 260:

(1) Obtaining coarse focus. The reflective positioning system 230 is activated to obtain a degree of coarse focus with respect to a reflected object observed through the objective 203. For example the object can be reflected from a surface of the specimen carrier 212 such as the lower surface 214s of the coverslip 214, which is immediately adjacent the specimen 202. In operation, the illumination source for the reflective positioning system 230 is turned on, and the RP optics forms an image from the light via the objective 203. Using light reflected back from the surface 214s, through the objective 203, to the RP optics, the Z drive is operated to move stage 207 along the optical axis until the reflected mage is in focus. The control of the Z drive is closed loop and this focusing step is performed without contribution from the image-based autofocus system 240.

(2) Moving the stage 207 via X-Y scanning to a new field of view of the specimen.

(3) Obtaining magnified images for fine focus. The image-based autofocus system 240 is operated to determine a best focus with respect to one or more sequences of magnified images of the specimen 202 obtained from a stack of focal planes along the optical axis, including the focal plane at the coarse-focus Z-position determined by the reflective positioning system 230. In this regard, autofocus illumination is initiated. For example, the reflective dark field illumination system 310 of FIG. 19 is activated by a strobe pulse synchronized with the scanning of the stage 207. At least one sequence of magnified images of the specimen is obtained. Preferably, the image-based autofocus system 240 obtains at least two sequences of magnified images using astigmatism with chromatic aberration.

(4) Obtaining fine focus. The sequence of magnified images is acquired and provided to the autofocus programming 261 of FIG. 18, which performs focus calculations to determine best focus. For example, but without limitation, the calculations for best focus are carried out according to equations (2) and (3).

(5) Control of the stage's position along the optical axis is assumed by a fine focus function of the autofocus programming 261, and (6) fine focus is obtained by moving the stage 207 along the optical axis from the coarse focus position to the calculated best focus position, and the calculated best focus position replaces the coarse focus position. Presuming fluorescence imaging, for each fluorescence channel, the stage 207 is moved along the optical axis to a calculated best focus value for the channel, the microscope filter/illumination setting is changed for the channel and, (7) a fluorescence image of the specimen is obtained from the channel via the imaging system 220. Alternatively, the coarse focus position is left alone and external fine focus is used to carry out fine focus for each fluorescent camera; a separate EFF system for each fluorescent camera utilizes a pre-calibrated offset to correct for differences in focus due to chromatic aberration or differences in axial position of the respective cellular components. Thus, with EFF, fine focusing operates independently of coarse focusing, and each EFF/filter/camera combination is adjusted in parallel to speed multi-channel (multi-color) fluorescence image acquisition.

(8) If the scan is not complete, the stage 207 is moved to the next field of view and the preceding sequence is repeated. Otherwise, if there is not another specimen, the procedure exits. Or else if there is another specimen, load and commence the preceding sequence.

Figure 21B:
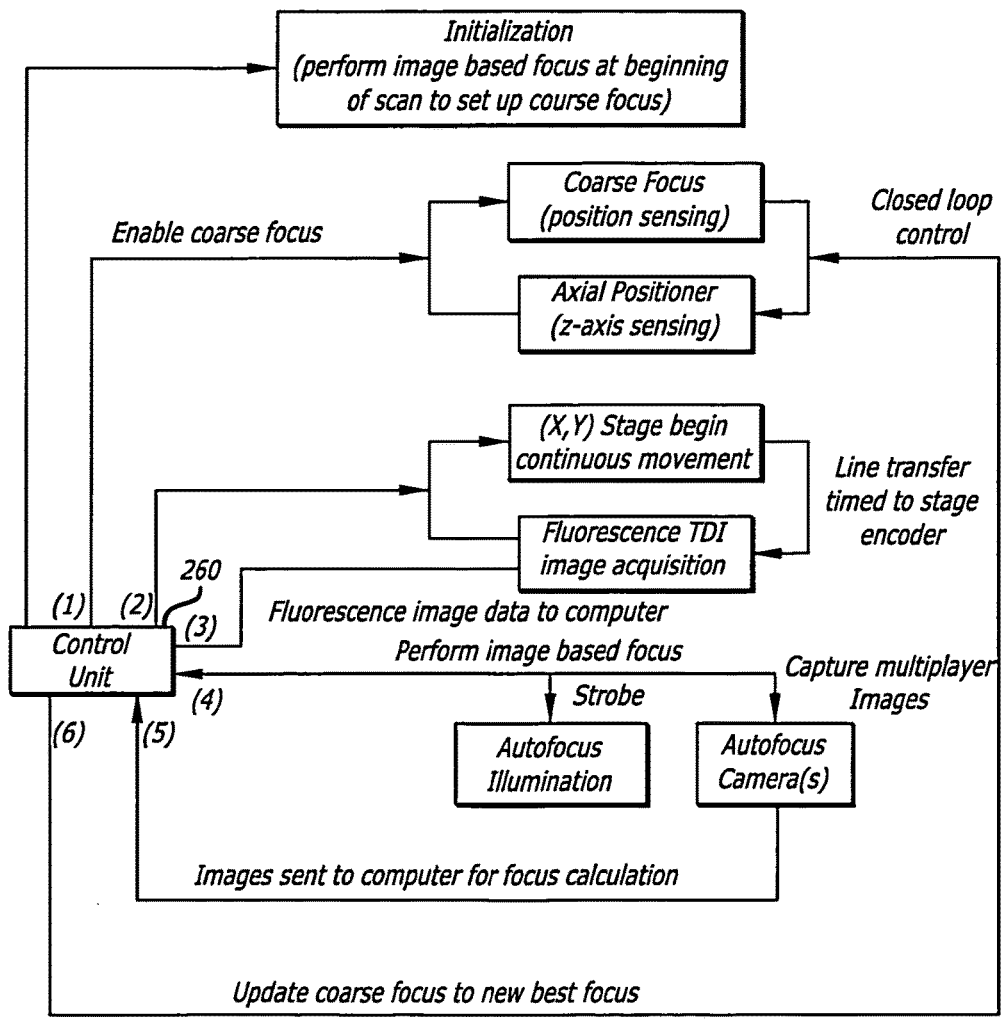
FIG. 21B is a flow diagram illustrating a method of operating an automated microscopy system using multifunction autofocus during continuous scanning.

With reference to FIGS. 18 and 21B, the scraper 291 enables reflected darkfield illumination 310 to be used with strobed illumination for light source 311 (or TDI cameras in place of autofocus cameras 245a and 245b) for multifunction autofocus in continuous scanning. See (Bravo-Zanoguera, M. E., Laris, C. A., Nguyen, L. K., Oliva, M. & Price, J. H. Dynamic autofocus for continuous-scanning time-delay-and-integration image acquisition in automated microscopy. Journal of Biomedical Optics 12, 34011/34011-34016, 2007). As per FIG. 21B, the system 200 initializes by using an image-based autofocus step to set up coarse focus by position sensing, followed by step (1) per FIG. 21A. In step (2), the system 200 begins continuous scanning by X-Y movement of the stage 207, with line transfer of images synchronized with the operation of the stage encoder 213. In step (3) during scanning, images are acquired by fluorescence TDI (time delay integration) and the fluorescent image data is acquired and stored by the control unit 260. Multi-planar autofocus is performed by the system in steps (4) and (5) (which correspond to steps (3) and (4), respectively, of FIG. 21A). In step (6), the coarse focus value is updated with the best focus value determined in steps (4) and (5). During continuous scanning, steps 1-6 run continuously as a sample is scanned. Steps 4-6 are performed incrementally (for example, every ~500 um or as necessary to maintain focus) as opposed to steps 1-3 which are always on.

Figure 22:
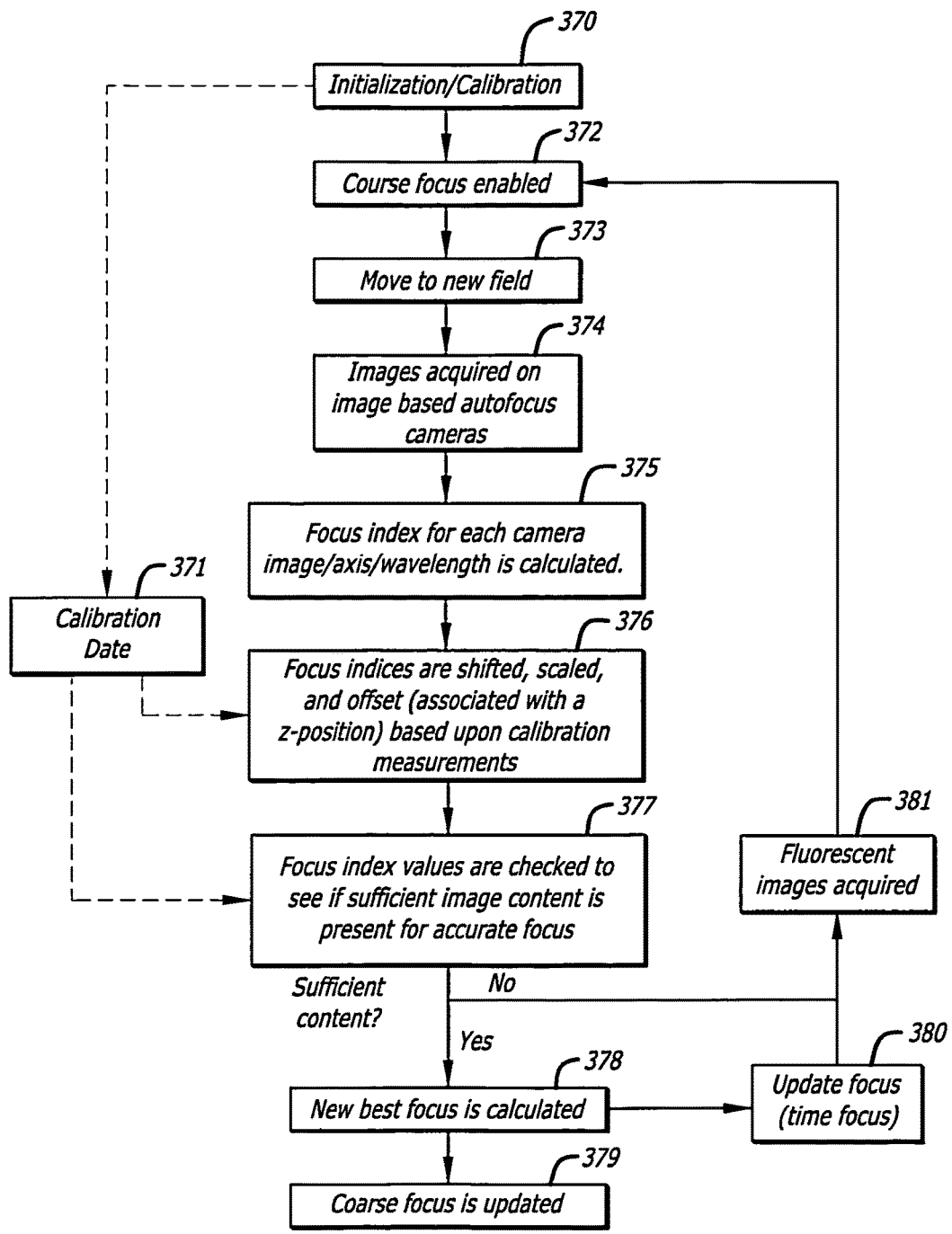
FIG. 22 is a flow diagram illustrating a method of determining focus for an automated microscopy system.

Per FIGS. 18 and 22, the autofocus programming 261 is further constructed to enable the controller to perform a method of determining focus for an automated microscopy system by controlling certain components of the system, including the reflective positioning system 230 and the image-based autofocus system 240. A specimen is mounted to the stage 207 and the control unit 260 automatically operates the system 200 according to the method of FIG. 22.

(370, 371) Calibration values are initialized per equations (4) and (5). Preferably, but not necessarily, raw (unprocessed) focus values are obtained from a "through-focus z-stack", that is to say, a sequence of magnified images from a sequence of focal planes extending along the optical axis and including a preselected focus position. The focus position can be selected, for example by the eye of a user. A representative through-focus z-stack relative to the preselected focus position is: −925, −800, −675, −550, −475, −400, −325, −275, −250, −225, −200, −192, −184, ... (steps of 8) ... , 184, 192, 200, 225, 250, 275, 325, 400, 475, 550, 675, 800, 925. When these steps are expressed in microscope z-position units of 25 nm/unit, the total through-focus Z-stack is ~46 um. These positions are merely for example and were chosen for a 5 um tissue section. The wide range provided an accurate estimate of a baseline and the smallest steps of 8 units=0.2 um were chosen based upon the width of each focus function. Smaller ranges and smaller steps could be used for well-plates. For the fluorescent mode example, while the through-focus Z-stack is collected, the focus index is calculated for each color channel and each axis. Thus, for example, with 2 CCD cameras for autofocus, 3 colors, and 2 astigmatism axes, 12 focus functions are calculated for the stacks. The focus functions are the raw focus functions used for calibration according to equation (6).

(372) Reflective positioning is enabled and coarse focus is acquired; it is assumed that this places the stage close to where best focus is. Image-based autofocus using chromatic and astigmatic aberrations provides a correction to this position. Upon a subsequent activation of reflective positioning (such as when a new specimen is placed on the stage or the stage is moved to a new X-Y field), a certain amount of time may be required to settle the reflective positioning system.

(373) Presuming a scan mode operation, the stage is moved to a new X-Y field.

(374) At the new field, the dark field illumination is strobed and a single image is acquired on each autofocus camera 245*a* and 245*b*.

(375) For each color from each camera calculate the focus index for both astigmatism axes. Following the example of FIG. 18, with 2 CCD cameras for autofocus, 3 colors, and 2 astigmatism axes, 12 focus functions are calculated for the stacks. The focus functions are the raw focus functions used for calibration according to equation (6).

(376) Calibrate the focal indices using calibration information obtained at 370, 371. For example, using equation (6), for each calibrated focus index, shift and scale the raw (uncalibrated) value according to the values recorded during the calibration initialization through-focus z-series. This should be f=(f_raw−shift)/scale, where the shift and scale are unique for each wavelength, camera, and axis.

(377) Check the observed field for image content. In this regard, if none of the focus indices are greater than a focus index threshold value (for example, 0.1, in which there is less than 10% of the image information in the focus spectral band compared to the calibration field) the field is deemed to contain low content and, at 380, the focus defaults to the reflective positioning (coarse) focus position, and the reflective positioning system is disabled. Fluorescent images are acquired at predetermined offsets from the coarse focus position, the reflective positioning system is re-enabled (372), and the stage is moved to the next field position (373). If at least one focus index is greater than 0.1, a new best focus is calculated and the stage is moved along the optical axis to the best focus location (378), and the coarse function value is updated to the best focus value while the method proceeds through 380, 381, et seq. It should be noted that the focus index threshold value of 0.1 is arbitrary; other values may be determined by trial and error, or by other methods.

With alternative external fine focus (EFF) 223, which operates independently of coarse focus, step 380 (Coarse focus is disabled) is skipped and fine focus is carried out by the EFF system 223, and EFF is adjusted for each fluorescent channel (color). If the field is deemed to contain low content, EFF is not used for fine focus, rather only to adjust for the precalibrated differences in focus between the various fluorescent channels.

INDUSTRIAL APPLICATION

Figure 23:
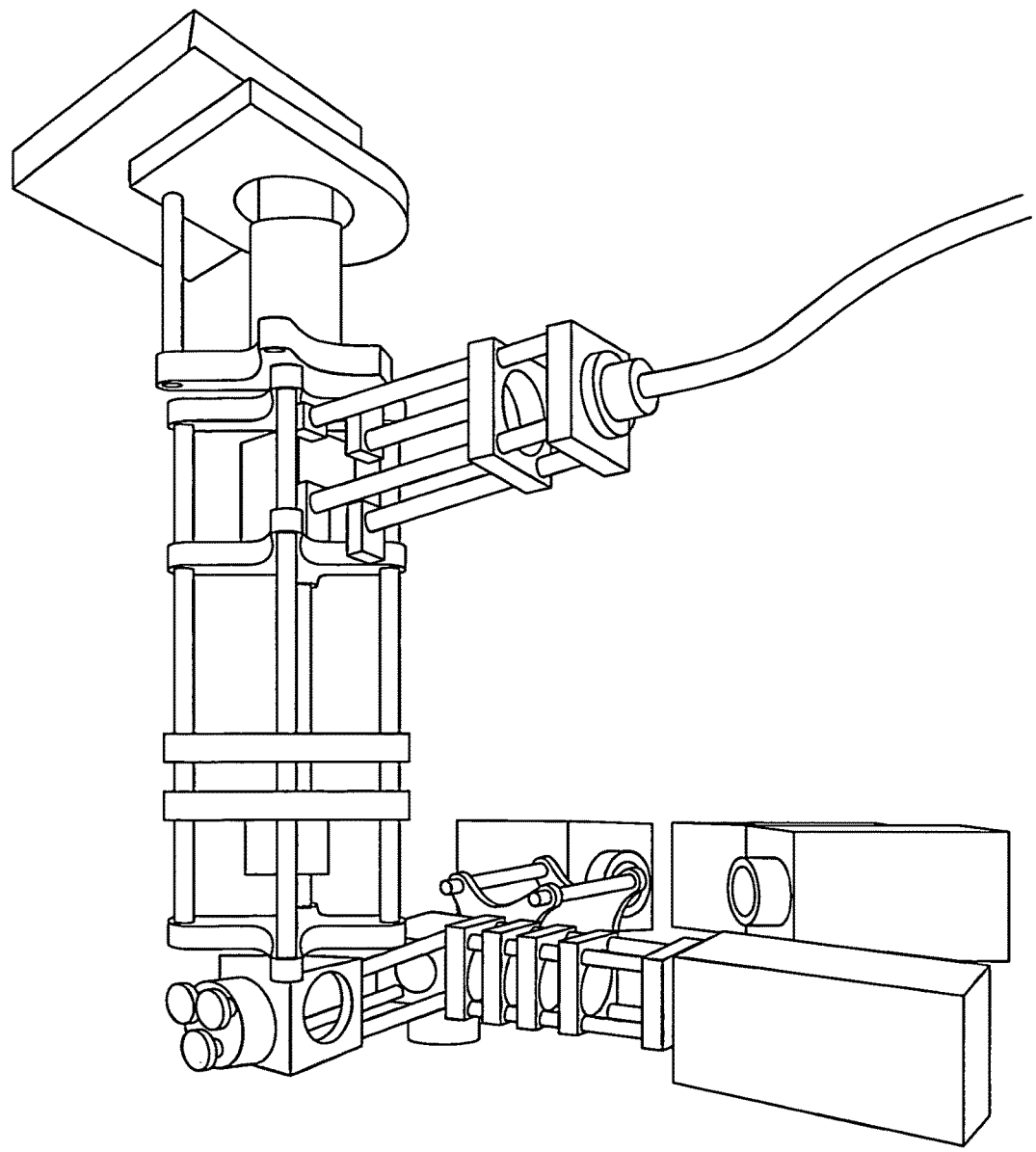
FIG. 23 is a representational illustration of an open frame microscope construction including illumination and scraper mirror output ports.
Figure 24:
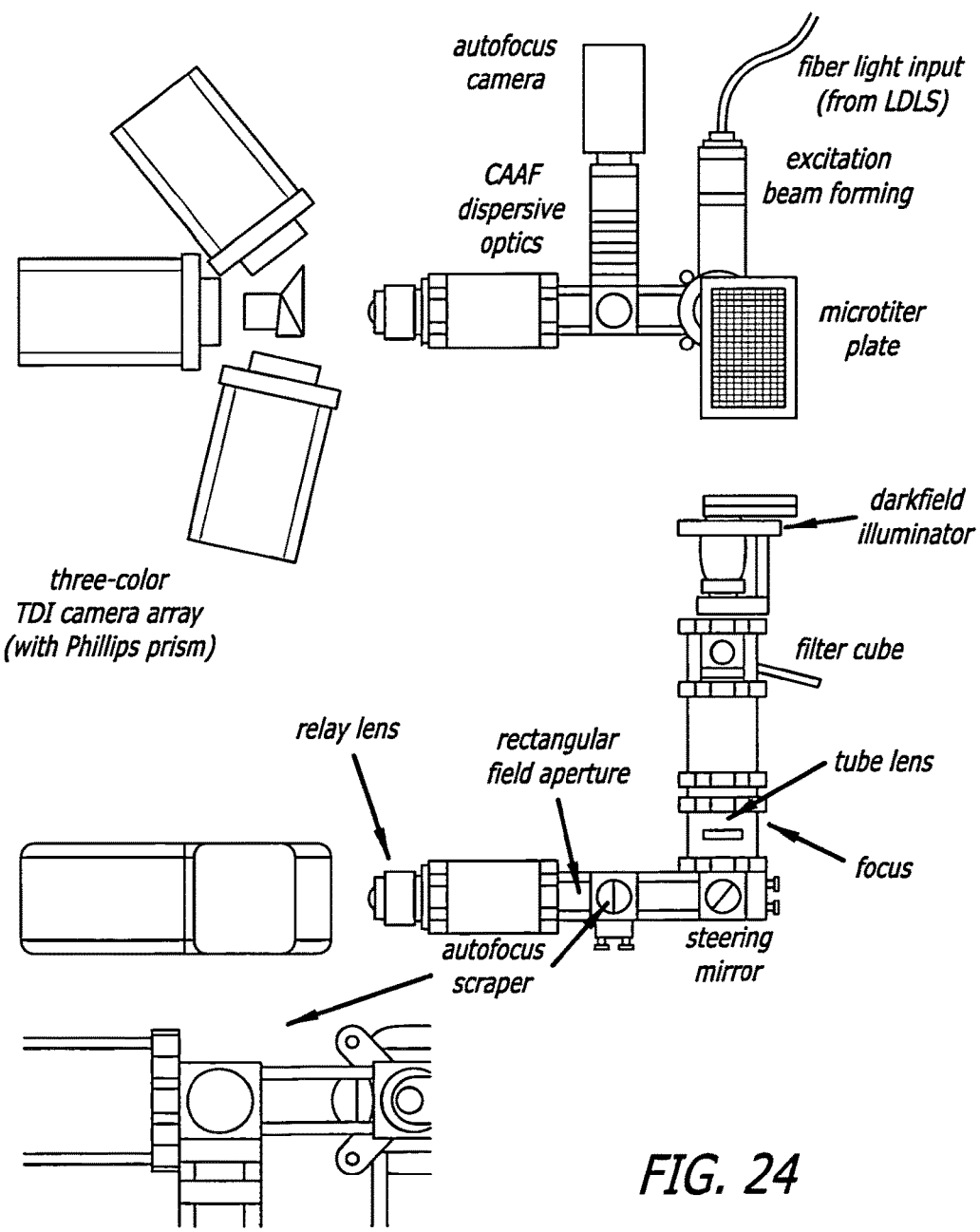
FIG. 24 is a diagram of the layout of components of FIG. 23 that includes top and front views of the open frame microscope construction with primary optical and mechanical components labeled.

Referring to FIGS. 23 and 24, an open frame design for integration of multifunction autofocus elements into an automated microscopy system enables direct and easy access to the optical paths for additions such as through-the-lens (TTL) reflective position sensing and for incorporation of other microscope modalities such as phase contrast and differential interference contras. This design has a three-fold objective. First, it is desirable to limit the count of optical components in order to reduce optical loss and optical scatter. Second, it is desirable to improve access to various locations in the optical path and to permit easy addition of features to the instrument. Finally, it is desirable to eliminate unneeded mounts and assemblies (e.g., eyepieces) so as to allow easier integration of microtiter plate translation with the opto-mechanical system.

FIG. 23 illustrates an open frame microscope in which opto-mechanical integration is based on 6013 aluminum mounts with low-thermal expansion carbon fiber shafts. An illumination port is on the upper right side. A port for scraper mirror output for autofocus is shown in the lower right.

FIG. 24 shows top and front views of the open frame microscope with primary optical and mechanical components labeled.

The open frame microscope is intended for use with a broad range of commercially-available, or custom-built, automated microscopy systems. For purposes of illustration, we describe an open frame microscope designed with reference to a commercially-available Nikon® CFI60 optical system ("the microscope system"), although this is not intended to limit the application of the principles to be discussed and illustrated. In the microscope system, objectives are coupled with a tube lens thereby establishing a common optical design that minimizes aberrations while obtaining diffraction-limited performance. All objectives are parfocal, with the front focal plane located 60 mm from the rear shoulder of the objective. There is an "infinity" corrected space between the objective and the tube lens. This enables components, particularly angle-sensitive components, such as dichroic mirrors and interference filters, to be placed in this space. Vignetting caused by the aperture of the tube lens is negligible if the distance between the objective and the tube lens is less than 200 mm. The tube lens (Nikon® MXA22018) creates an image 200 mm displaced from its rear principal plane. A rectangular aperture is placed in this plane to define the object field-of-view and to reduce stray light.

The image created by the tube lens is relayed to the three-color TDI (time delay integration) camera array and to the autofocus system using a Schneider® Macro Varon™ MVR4.5/85 relay lens (85 mm focal length, f/4.5). The TDI camera is used for continuous scanning as previously described, for example in U.S. Pat. No. 6,839,469. For incremental scanning, the TDI camera is replaced with a 3-color 2D scientific grade camera. The MVR4.5/85 was originally designed for ultra-high resolution industrial line scan applications; in fact, its performance is well-suited for microscopy. The measured polychromatic modulation transfer function indicates that it performs well as a relay lens. We modeled the polychromatic MTF (modulation transfer function) of the MVR4.5/85 at four different field locations (0.0 mm, 17.2 mm, 25.2 mm, 31.0 mm) for a magnification ($\beta$) of −1.5×. Near diffraction-limited performance was obtained, with modulation indices of better than 0.25 for spatial frequencies of 100 cycles per mm The modulation indices were modeled as a function of transverse field locations for several different spatial frequencies (10, 20, 30, 40, 50, 60 cycles per mm) and similar excellent near-diffraction limited results were obtained. The fluorescence excitation light from the LDLS (laser diode light source) is delivered via relay optics mounted on the open-frame system as shown in FIG. 23.

Preferably, the objective is a Nikon® CFI Plan Apochromat VC 20×NA0.75 lens. In tests using a Nikon® Ti-E inverted microscope we obtain diffraction-limited performance with extremely low chromatic aberration (see FIGS. 7 and 9). Standard Nikon® filter cubes can be used between the objective and the tube lens. Using standard cubes allows for more economical selection of various excitations and emissions for different assay requirements.

Mechanical Framework of the Open Frame Microscope.

As per FIGS. 23 and 24, the open frame provides an alternative to a conventional microscope base (such as the Nikon® Ti-E). Preferably, but not necessarily, the design utilizes the 4-rod LINOS® Microbench opto-mechanical construction. The open frame microscope consists of 6013 aluminum mounts attached to either 316 stainless steel shafts (for prototyping) or low-thermal expansion carbon fiber shafts (for production). With this design additional components, such as additional filter cubes or scan ports for laser ablation can be more easily inserted. We have found that assemblies based on this system are quite stable, both mechanically and thermally. In addition, since our HTS instruments are used in a controlled environment, with vibration isolation and thermal control, there is negligible thermal drift or other instabilities.

A microtiter plate is scanned over the objective using a motorized stage or microtiter plate robotic. The framework for the external casing for environmental containment is fabricated using extruded 6105-T5 aluminum framing (80/20 Inc., T-slot framing). Residual thermal drift of the mechanical and opto-mechanical systems are compensated by the chromatic aberration image-based autofocus.

Figure 25:
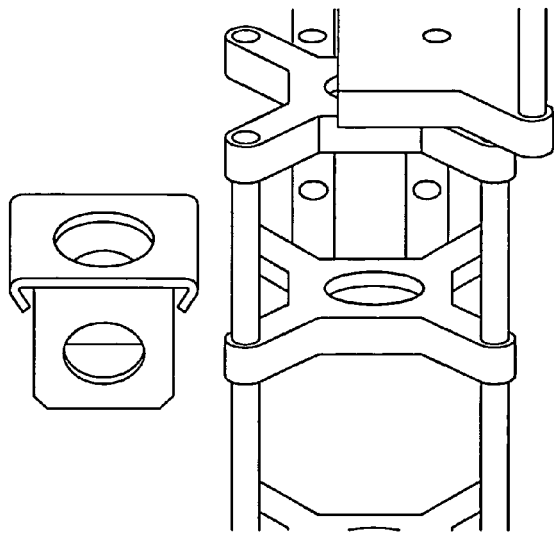
FIG. 25 is a detailed view of the open frame microscope construction showing a kinematic filter cube mount.

The open frame design has several options in addition to the conventional motorized stage typically used on a microscope such as the Nikon Ti-E inverted microscope for specimen scanning. For example, two robotic alternatives, an Aerotech® gantry robot or a Denso® SCARA robot with voice coil actuators for both length-of-well continuous scanning. The SCARA robot can move well-well and the feedback-controlled voice coil provides precision-velocity scanning across each well. Fine focus will serve three functions: plate loader, plate scanner, and objective selector. For axial specimen positioning (focus), alternatively a piezoelectric microtiter plate axial positioner can be integrated into the chosen plate translation robot. The objective and filter cube are kinematically located using a combination of precision ball bearings and precision rods and fixed using high-strength NdFeB magnets. In this regard, FIG. 25 shows a detail view of kinematic filter cube mount, which consists of adapter (shown flipped) that mates with a mounting plate. The cube slides into the adapter. The excitation is spatially shaped to illuminate a region slightly larger than imaged by the TDI cameras, thus increasing the excitation power density. The autofocus and TDI cameras are described below.

Figure 26:
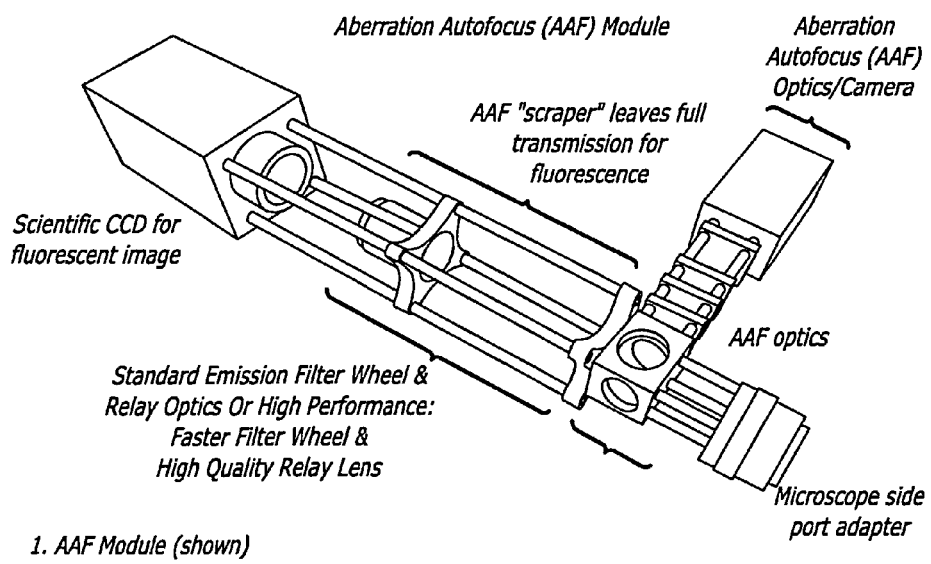
FIG. 26 is a representational illustration showing aberration autofocus as an adapter to a camera port of a microscope.

An aberration autofocus (AAF) unit (comprised of 240 in FIGS. 19A and 19B) and shown without detail along with a fluorescence imaging camera as per FIG. 26, can be provided as an adapter to the side port (or any other camera port) of a microscope or other optical system, such as the Nikon Ti-E and used in conjunction with TTL (through-the-lens) or BTL (beside-the-lens) reflective positioning for multifunction autofocus. As shown, an autofocus module can be a stand-alone component that can be added to any microscope. Companion components can include a strobed reflected dark field or transmitted light source. High angle reflected illumination for the dark field imaging effect can be created using the "oblique illumination" (over-the-lens) configuration used for imaging for the data of FIGS. 10-11, or through-the-lens dark field optics as diagramed in FIGS. 19A and 19B. We have found that through-the-lens reflected dark field usually produces better images than oblique over-the-lens dark field, but both can be used for autofocus.

Figure 27:
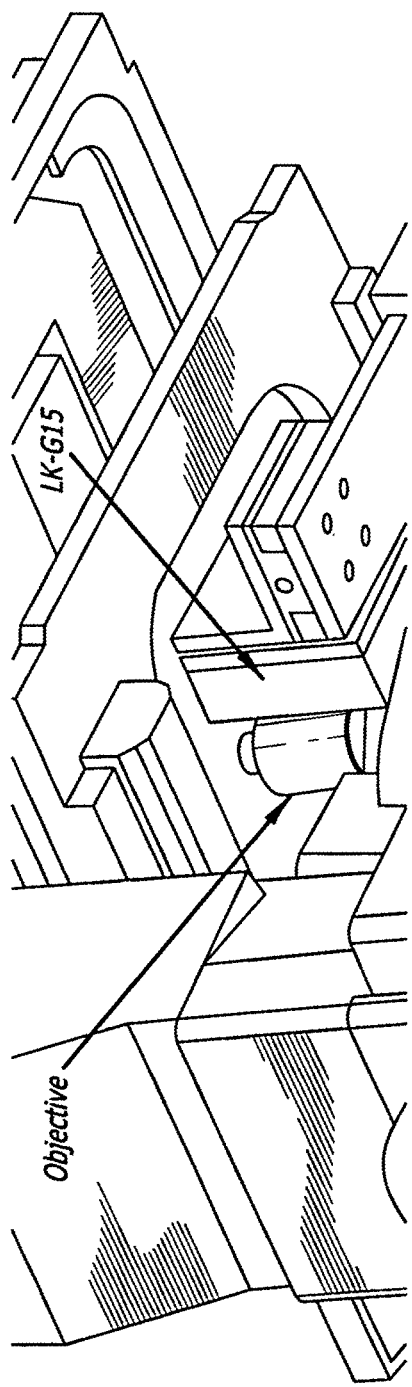
FIG. 27 is a representational illustration showing a sensor mounted adjacent the objective of an inverted microscope for BTL reflective positioning autofocus, which includes a non-TTL reflective position sensor.

The position sensing system for the multifunction autofocus element of an automated microscopy system according to this specification can be provided as a TTL configuration (see, for example, the Nikon® perfect focus reflective positioning system), or it can be in a BTL configuration as shown in FIG. 27. The BTL configuration has the advantage of profiling the surface ahead of the imaging direction. As per FIG. 27, the position of an LK-G15 Keyence displacement sensor under the stage, next to the objective on an inverted microscope. The mounting bracket is to the outside (right) in order to place the sensor as close to the objective as possible.

Increasing scanning speed is important where larger numbers of samples are to be screened. For incremental stage motion, scanning speed can be increased by carrying out steps in parallel as demonstrated in a scanning process that includes:

1. Calibrate the reflective sensing position (TTL or BTL) to the best focus of the image acquisition camera.
2. Place the first sample on the microscope manually or robotically.
3. Define the scanning area(s) or load them from a file for scanning.
4. Calibrate the multi-planar image-based autofocus system as described above and defined by equations (4)-(6).
5 Define the scanning area(s) or load them from a file for scanning.
6. Initiate (or continue) automatic scanning, which includes:
   a. Initiate the stage movement to the next field of view (BTL-profile the surface via reflective position sensing while moving and record the profile).
   b. Coarse focus: Move the Z-position (focus) to the position recorded by the reflective position sensing device (BTL) or closed-loop RP to adjust focus while moving to the field of view (TTL).
   c. Stop at the field of view and obtain a sequence of images for autofocus.
   d. Calculate best focus using equations (2) and (3).
   e. Move to best focus (fine focus).
   f. Acquire the in focus image and:
      i. Save the image to the hard drive and
      ii. Update the reflective positioning offset position for the next field of view to compensate for changing thickness of the substrate and specimen.
   g. If scan is not complete:
      i. Repeat 5.
   h. else if scan is complete:
      i. If there is not another specimen, exit the scanning program,
      ii. Else signal the robot to unload the specimen and load the next specimen, begin moving to the first field of view, and go to 5
7. Perform image analysis either after scanning or in parallel as the images are acquired and stored.

Alternatively, a look-ahead image-based autofocus system can be used with BTL or TTL reflective positioning. With the scraper mirror optical configuration of FIG. 19, the scraper mirror is placed so that the autofocus cameras acquire a field of view immediately adjacent to and ahead of the fluorescence imaging system camera. The scanning process includes:

1. Calibrate the reflective sensing position to the best focus of the image acquisition camera.
2. Place the first sample on the stage manually or robotically.
3. Define the scanning area(s) or load them from a file for scanning.
4. Calibrate the image-based autofocus system as described above and defined by equations (4)-(6).
5. Perform (or continue) automatic scanning, which includes:

a. If the next field of view is not adjacent to the previous field of view (e.g., true for the first field of view of the specimen, the beginning of a scanning row or the beginning of a new well):
   i. Initiate stage movement to the lateral position just before the field of view (the position where the autofocus cameras are centered in the field of view), profile the surface via reflective position sensing while moving and record the profile.
   ii. Move the axial position (focus) to the position processed from the reflective position sensing device while moving to the first field of view (look ahead).
   iii. Complete the lateral and axial moves of 5.a.i and 5.a.ii.
   iv. Strobe to produce a sequence of images on the autofocus cameras and carry out the following in parallel:
      1. Initiate lateral stage movement to the imaging field of view.
      2. Download the sequence of images from the autofocus cameras to the controller and
         a. Then calculate best focus using equations (2) and (3), and
         b. Then initiate axial movement to the final best focus position.
      3. Complete the lateral and axial moves.
      4. Strobe to produce a sequence of images on the autofocus cameras
   v. Initiate acquisition of the in-focus image and
      1. Download the sequence of images from the autofocus cameras,
         a. Then calculate best focus using equations (2) and (3), and
         b. Store the best focus position.
   vi. Complete image acquisition of the in focus image and:
      1. Save the image to the hard drive and
      2. Update the reflective positioning offset position for the next field of view to compensate for changing thickness of the specimen holder and specimen.
b. Else if the next field of view is adjacent to the current field of view:
   i. Initiate stage movement to the next field of view
   ii. Initiate axial movement to the best focus position
   iii. Complete the lateral stage and axial focus moves.
   iv. Strobe to produce a sequence of images of the adjacent field of view on the autofocus cameras.
   v. Initiate acquisition of the in focus image.
   vi. Download the sequence of images from the autofocus cameras,
      1. Then calculate best focus using equations (2) and (3), and
      2. Then store the best focus position.
   vii. Complete image acquisition of the in focus image and:
      1. Save the image to the hard drive and
      2. Update the reflective positioning offset position for the next field of view to compensate for changing thickness of the substrate and specimen.
c. If scan is not complete:
   i. Repeat 5.
d. Else if scan is complete:
   i. If there is not another specimen, exit the scanning program,
   ii. Else signal the robot to unload the specimen and load the next specimen, and
      a. Repeat 5.
6. Perform image analysis either after scanning or in parallel as the images are acquired and stored.

Although autofocus systems and methods for automated microscopy have been described with reference to preferred embodiments, constructions, and procedures, it should be understood that various modifications can be made without departing from the spirit of the principles represented thereby. Accordingly, the scope of patent protection afforded those principles is limited only by the following claims.

We claim:

1. A method of focusing an automated microscopy system including an objective, a stage, and an optical axis passing through the objective and the stage, by:
   obtaining a coarse focus value with a reflective positioning system using an image reflected from an object surface including a bottom surface or a top surface of a specimen holder;
   obtaining a coarse focus corresponding to the coarse focus value;
   obtaining a fine focus value with an image-based autofocus system using one or more of quality, sharpness or resolution of an image of a specimen mounted on the specimen holder;
   updating the coarse focus value with the fine focus value; and,
   causing relative movement between the objective and the stage to obtain a fine focus corresponding to the updated coarse focus value;
   in which obtaining the fine focus value with an image-based autofocus system includes directing light from a specimen to the image-based autofocus system, introducing astigmatism into the light when the light is transferred to the image-based autofocus system, simultaneously generating a stack of focal plane images of the specimen from the light and obtaining a best focus value from the stack, wherein the best focus value is the fine focus value.

2. The method of claim 1, in which simultaneously generating the stack of focal plane images of the specimen from the light includes introducing chromatic aberration into the light along with the astigmatism.

3. The method of claim 1, in which directing light from the specimen to the Image-based autofocus system, includes directing oblique or dark field reflected illumination through the objective to the specimen, directing the oblique or dark field illumination scattered by the specimen through the objective to the image-based autofocus system.

4. The method of claim 3, in which simultaneously generating the stack of focal plane images of the specimen from the light includes introducing chromatic aberration into the dark field illumination scattered by the specimen.

5. The method of claim 4, in which obtaining the coarse focus value with a reflective positioning system includes sensing a reflected image through one of the objective and a sensor beside the objective.

* * * * *

UNITED STATES PATENT AND TRADEMARK OFFICE
CERTIFICATE OF CORRECTION

PATENT NO. : 10,001,622 B2
APPLICATION NO. : 13/317727
DATED : June 19, 2018
INVENTOR(S) : Jeffrey H. Price et al.

Page 1 of 1

It is certified that error appears in the above-identified patent and that said Letters Patent is hereby corrected as shown below:

In the Specification

In Column 1, Lines 7 through 12, please replace:
"The invention or inventions described herein were made in part with United States government support under NIBIB Grant 5 R01 EB006200, NHGRI Grant 5 U54 HG003916, and NHGRI Grant HG005033-CDP3, all awarded by the National Institutes of Health. The United States government has certain rights in this invention."

With:
"This invention was made with government support under R01 EB006200, U54 HG003916, and HG005033 awarded by the National Institutes of Health. The government has certain rights in the invention."

Signed and Sealed this
Tenth Day of December, 2024

Katherine Kelly Vidal
*Director of the United States Patent and Trademark Office*